US011582629B2

United States Patent
Manolakos et al.

(10) Patent No.: US 11,582,629 B2
(45) Date of Patent: Feb. 14, 2023

(54) DETERMINATION OF AN ACTIVE BANDWIDTH PART TRANSITION DURING A POSITIONING SESSION

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Arash Mirbagheri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/127,360

(22) Filed: Dec. 18, 2020

(65) Prior Publication Data
US 2021/0314800 A1    Oct. 7, 2021

Related U.S. Application Data

(60) Provisional application No. 63/004,986, filed on Apr. 3, 2020.

(51) Int. Cl.
| | |
|---|---|
| *H04W 24/10* | (2009.01) |
| *H04L 41/0803* | (2022.01) |
| *H04W 72/0446* | (2023.01) |
| *H04L 5/00* | (2006.01) |

(52) U.S. Cl.
CPC ........... *H04W 24/10* (2013.01); *H04L 5/0048* (2013.01); *H04L 41/0803* (2013.01); *H04W 72/0446* (2013.01)

(58) Field of Classification Search
CPC .......................... H04W 24/10; H04L 41/0803
See application file for complete search history.

(56) References Cited

U.S. PATENT DOCUMENTS

| | | | | |
|---|---|---|---|---|
| 11,019,544 | B2 * | 5/2021 | Moon | H04W 76/38 |
| 2020/0037260 | A1 * | 1/2020 | Fu | H04W 72/042 |
| 2021/0320769 | A1 * | 10/2021 | Cha | G01S 5/06 |
| 2021/0351887 | A1 * | 11/2021 | Qi | H04W 24/08 |
| 2022/0131727 | A1 * | 4/2022 | Khoryaev | H04L 27/261 |

OTHER PUBLICATIONS

International Search Report and Written Opinion—PCT/US2021/015232—ISA/EPO—May 11, 2021.

(Continued)

*Primary Examiner* — Zhiren Qin
(74) *Attorney, Agent, or Firm* — Qualcomm Incorporated

(57) ABSTRACT

In an aspect, a UE receives, from a network entity, a configuration of PRS or SRS-P resources for a positioning session, receives a configuration of at least one BWP from a serving BS, identifies a time-domain period for the positioning session where a set of parameters associated with the at least one BWP is to remain constant to achieve a first positioning accuracy requirement. The UE either performs positioning measurements on one or more of the PRS resources during the positioning session or transmits on one or more of the SRS-P resources during the positioning session. The UE determines an active BWP transition during the time-domain period from a first BWP to a second BWP that is associated with one or more changes to the set of parameters.

30 Claims, 19 Drawing Sheets

(56) References Cited

OTHER PUBLICATIONS

Nokia, et al., "Views on Physical Layer Procedures for NR Positioning",3GPP Draft,R1-1910890,3GPP TSG RAN WG1 #98-bis,PHY Procs for NR Positioning,3rd Gen Partnership Project (3GPP)Mobile Comp Centre, 650,Route Des Lucioles,F-06921,Sophia-Antipolis Cedex,FR,vol. RAN WG1,No. Chongqing,CN, Oct. 14-Oct. 18, 2019,Oct. 4, 2019 (Oct. 4, 2019)XP051808282,6 pgs,Retrieved from Internet:URL:https://ftp.3gpp.org/tsg_ran/WG1_RL1/TSGR1_98b/Docs/R1-1910890.zip,R1-1910890 PHY Procedures for NR Positioning.docx[retrieved Oct. 4, 2019]p. 3,Para 2.4—p. 4.

Qualcomm Inc: On Impact of NR Positioning on Existing RRM Requirements , 3GPP Draft, R4-2000737, 3GPP TSG-RAN WG4 Mtg #94-e, 3rd Gen Partnership Project(3GPP)Mobile Comp Centre,650,Route Des Lucioles,F-06921 Sophia-Antipolis Cedex,FR,vol. RAN WG4,No. Online,Feb. 24-Mar. 6, 2020,Feb. 14, 2020(Feb. 14, 2020)XP051850708, pp.1-6,Retrieved from Internet:URL:https://ftp.3gpp.org/tsg_ran/WG4_Radio/TSGR4_94_e/Docs/R4-2000737.zip, R4-2000737—On Impact of NR Positioning on Existing RRM Reqs docx[retrieved Feb. 14, 2020]p. 3,Para 4.p. 5,Figs 1.2.

\* cited by examiner

DETERMINATION OF AN ACTIVE BANDWIDTH PART TRANSITION DURING A POSITIONING SESSION

CROSS-REFERENCE TO RELATED APPLICATION

The present Application for Patent claims the benefit of U.S. Provisional Application No. 63/004,986, entitled "MONITORING A SET OF BANDWIDTH PART PARAMETERS FOR A POSITIONING SESSION", filed Apr. 3, 2020, assigned to the assignee hereof and hereby expressly incorporated by reference herein in its entirety.

BACKGROUND OF THE DISCLOSURE

1. Field of the Disclosure

Aspects of the disclosure relate generally to wireless communications and more particularly to determination of an active bandwidth part (BWP) transition during a positioning session.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a method of operating a user equipment (UE), comprising receiving, from a network entity, a configuration of positioning reference signal (PRS) resources for a positioning session, receiving a configuration of at least one bandwidth part (BWP) from a serving base station (BS), identifying a time-domain period for the positioning session where a set of parameters associated with the at least one BWP is to remain constant to achieve a first positioning accuracy requirement, performing positioning measurements on one or more of the PRS resources during the positioning session, determining an active BWP transition during the time-domain period from a first BWP to a second BWP that is associated with one or more changes to the set of parameters, and transmitting a PRS measurement report based on the positioning measurements.

Another aspect is directed to a method of operating a user equipment (UE), comprising receiving, from a network entity, a configuration of sounding reference signal (SRS) resources for positioning (SRS-P) for a positioning session, receiving a configuration of at least one bandwidth part (BWP) from a serving base station (BS), identifying a time-domain period for the positioning session where a set of parameters associated with the at least one BWP is to remain constant to achieve a first positioning accuracy requirement, transmitting on one or more of the SRS-P resources during the positioning session, and determining an active BWP transition during the time-domain period from a first BWP to a second BWP that is associated with one or more changes to the set of parameters.

Another aspect is directed to a user equipment (UE), comprising means for receiving, from a network entity, a configuration of positioning reference signal (PRS) resources for a positioning session, means for receiving a configuration of at least one bandwidth part (BWP) from a serving base station (BS), means for identifying a time-domain period for the positioning session where a set of parameters associated with the at least one BWP is to remain constant to achieve a first positioning accuracy requirement, means for performing positioning measurements on one or more of the PRS resources during the positioning session, means for determining an active BWP transition during the time-domain period from a first BWP to a second BWP that is associated with one or more changes to the set of parameters, and means for transmitting a PRS measurement report based on the positioning measurements.

Another aspect is directed to a user equipment (UE), comprising means for receiving, from a network entity, a configuration of sounding reference signal (SRS) resources for positioning (SRS-P) for a positioning session, means for receiving a configuration of at least one bandwidth part (BWP) from a serving base station (BS), means for identifying a time-domain period for the positioning session where a set of parameters associated with the at least one BWP is to remain constant to achieve a first positioning accuracy requirement, means for transmitting on one or more of the SRS-P resources during the positioning session, and means for determining an active BWP transition during the time-domain period from a first BWP to a second BWP that is associated with one or more changes to the set of parameters.

Another aspect is directed to a user equipment (UE), comprising a memory, at least one transceiver, and at least one processor communicatively coupled to the memory, the at least one transceiver, the at least one processor configured to receive, from a network entity via the at least one transceiver, a configuration of positioning reference signal (PRS) resources for a positioning session, receive, via the at least one transceiver, a configuration of at least one bandwidth part (BWP) from a serving base station (BS), identify, via the at least one processor, a time-domain period for the positioning session where a set of parameters associated with the at least one BWP is to remain constant to achieve a first positioning accuracy requirement, perform, via the at least one processor, positioning measurements on one or more of the PRS resources during the positioning session, determine, via the at least one processor, an active BWP transition during the time-domain period from a first BWP to a second BWP that is associated with one or more changes to the set of parameters, and transmit, via the at least one transceiver, a PRS measurement report based on the positioning measurements.

Another aspect is directed to a user equipment (UE), comprising a memory, at least one transceiver, and at least one processor communicatively coupled to the memory, the at least one transceiver, the at least one processor configured to receive, from a network entity via the at least one transceiver, a configuration of sounding reference signal (SRS) resources for positioning (SRS-P) for a positioning session, receive, via the at least one transceiver, a configuration of at least one bandwidth part (BWP) from a serving base station (BS), identify, via the at least one processor, a time-domain period for the positioning session where a set of parameters associated with the at least one BWP is to remain constant to achieve a first positioning accuracy requirement, transmit, via the at least one transceiver, on one or more of the SRS-P resources during the positioning session, and determine, via the at least one processor, an active BWP transition during the time-domain period from a first BWP to a second BWP that is associated with one or more changes to the set of parameters.

Another aspect is directed to a non-transitory computer-readable medium containing instructions stored thereon, which, when executed by a user equipment (UE), cause the UE to perform operations, the instructions comprising at least one instruction to cause the UE to receive, from a network entity, a configuration of positioning reference signal (PRS) resources for a positioning session, at least one instruction to cause the UE to receive a configuration of at least one bandwidth part (BWP) from a serving base station (BS), at least one instruction to cause the UE to identify a time-domain period for the positioning session where a set of parameters associated with the at least one BWP is to remain constant to achieve a first positioning accuracy requirement, at least one instruction to cause the UE to perform positioning measurements on one or more of the PRS resources during the positioning session, at least one instruction to cause the UE to determine an active BWP transition during the time-domain period from a first BWP to a second BWP that is associated with one or more changes to the set of parameters, and at least one instruction to cause the UE to transmit a PRS measurement report based on the positioning measurements.

Another aspect is directed to a non-transitory computer-readable medium containing instructions stored thereon, which, when executed by a user equipment (UE), cause the UE to perform operations, the instructions comprising at least one instruction to cause the UE to receive, from a network entity, a configuration of sounding reference signal (SRS) resources for positioning (SRS-P) for a positioning session, at least one instruction to cause the UE to receive a configuration of at least one bandwidth part (BWP) from a serving base station (BS), at least one instruction to cause the UE to identify a time-domain period for the positioning session where a set of parameters associated with the at least one BWP is to remain constant to achieve a first positioning accuracy requirement, at least one instruction to cause the UE to transmit on one or more of the SRS-P resources during the positioning session, and at least one instruction to cause the UE to determine an active BWP transition during the time-domain period from a first BWP to a second BWP that is associated with one or more changes to the set of parameters.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
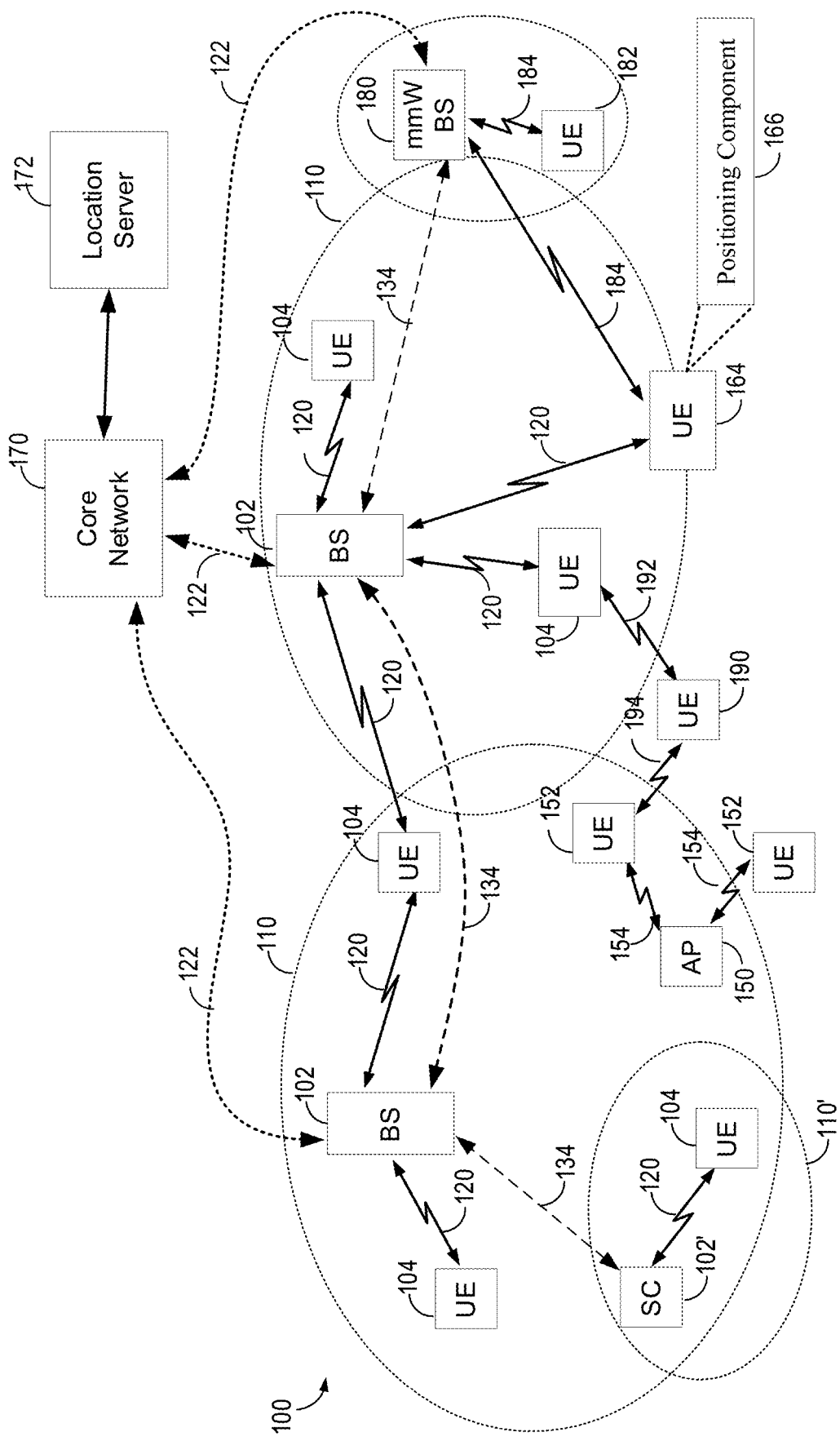
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a positioning component 166 that may enable the UE 164 to perform the UE operations described herein. Note that although only one UE in FIG. 1 is illustrated as having fully staggered SRS component 166, any of the UEs in FIG. 1 may be configured to perform the UE operations described herein.

Figure 2A:
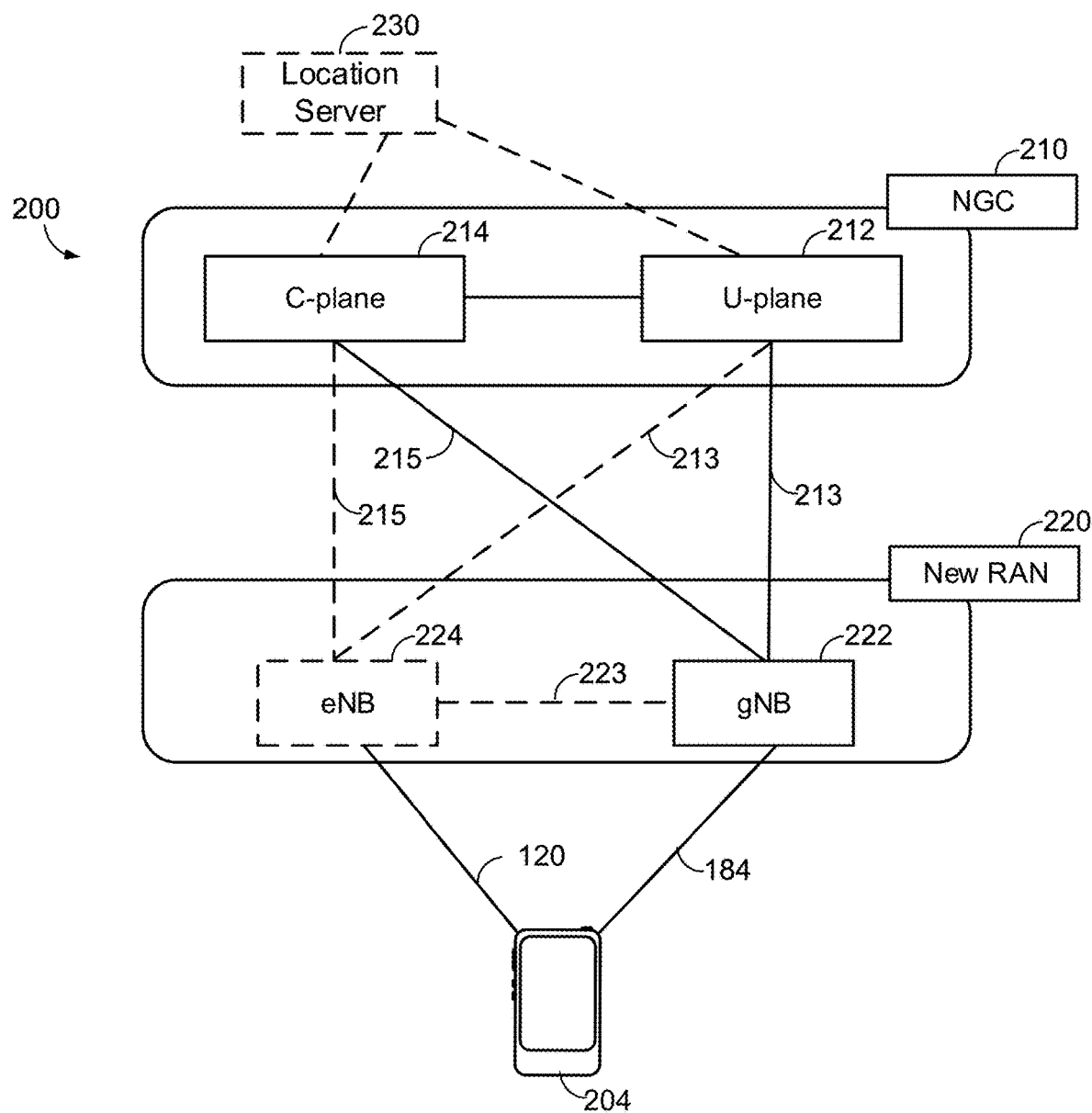
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
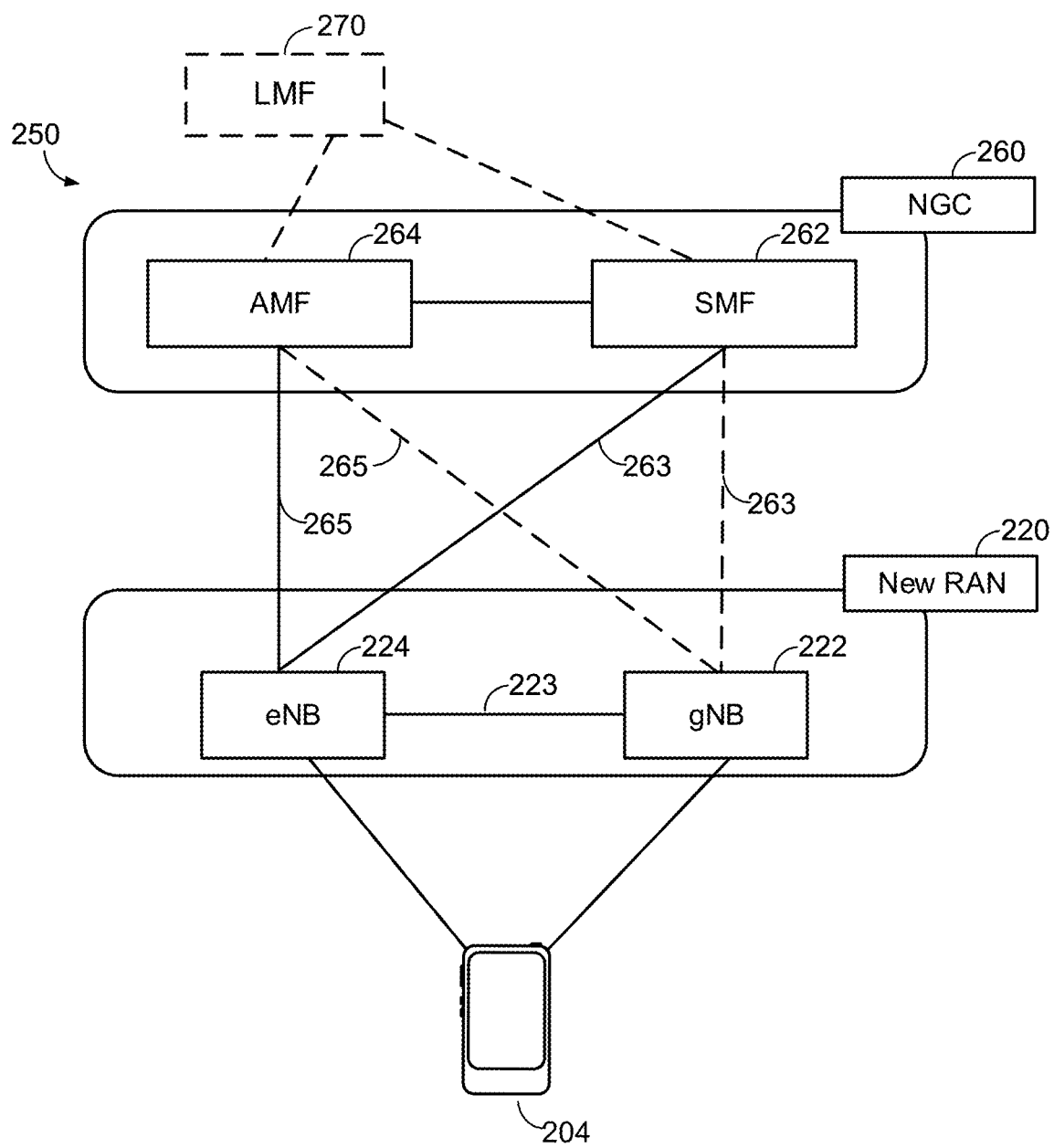

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
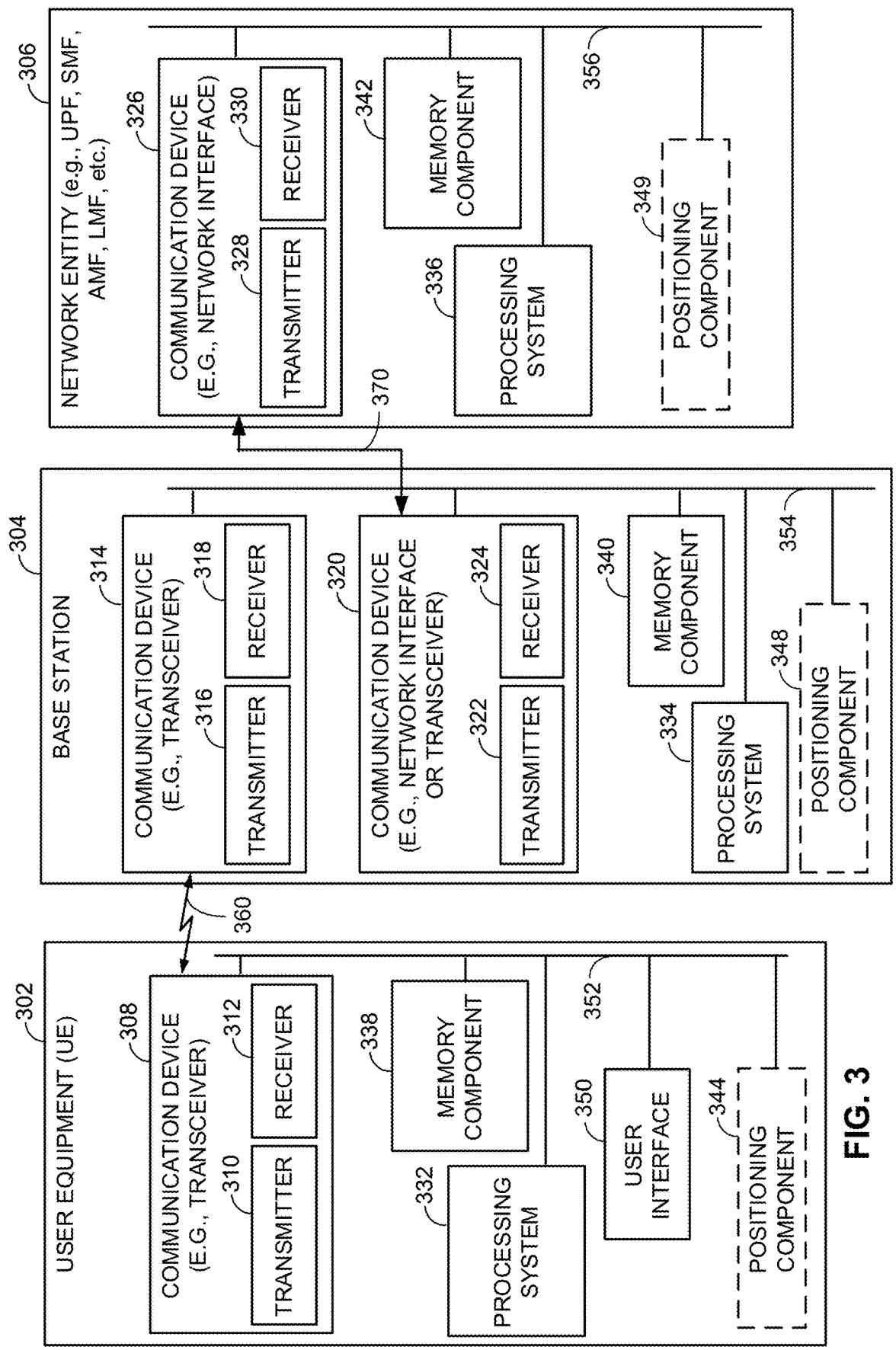
FIG. 3 is a block diagram illustrating an exemplary UE, according to various aspects.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for a radio resource control (RRC) layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302, 304 and 306 may include positioning components 344, 348 and 349, respectively. It will be appreciated the functionality of the various positioning components 344, 348 and 349 may differ based on the device where it is being implemented. The positioning components 344, 348 and 349 may be hardware circuits that are part of or coupled to the processing systems 332, 334, and 336, respectively, that, when executed, cause the apparatuses 302, 304, and 306 to perform the functionality described herein. Alternatively, the positioning components 344, 348 and 349 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 349 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, positioning components 344, 348 and 349, etc.

Figure 4:
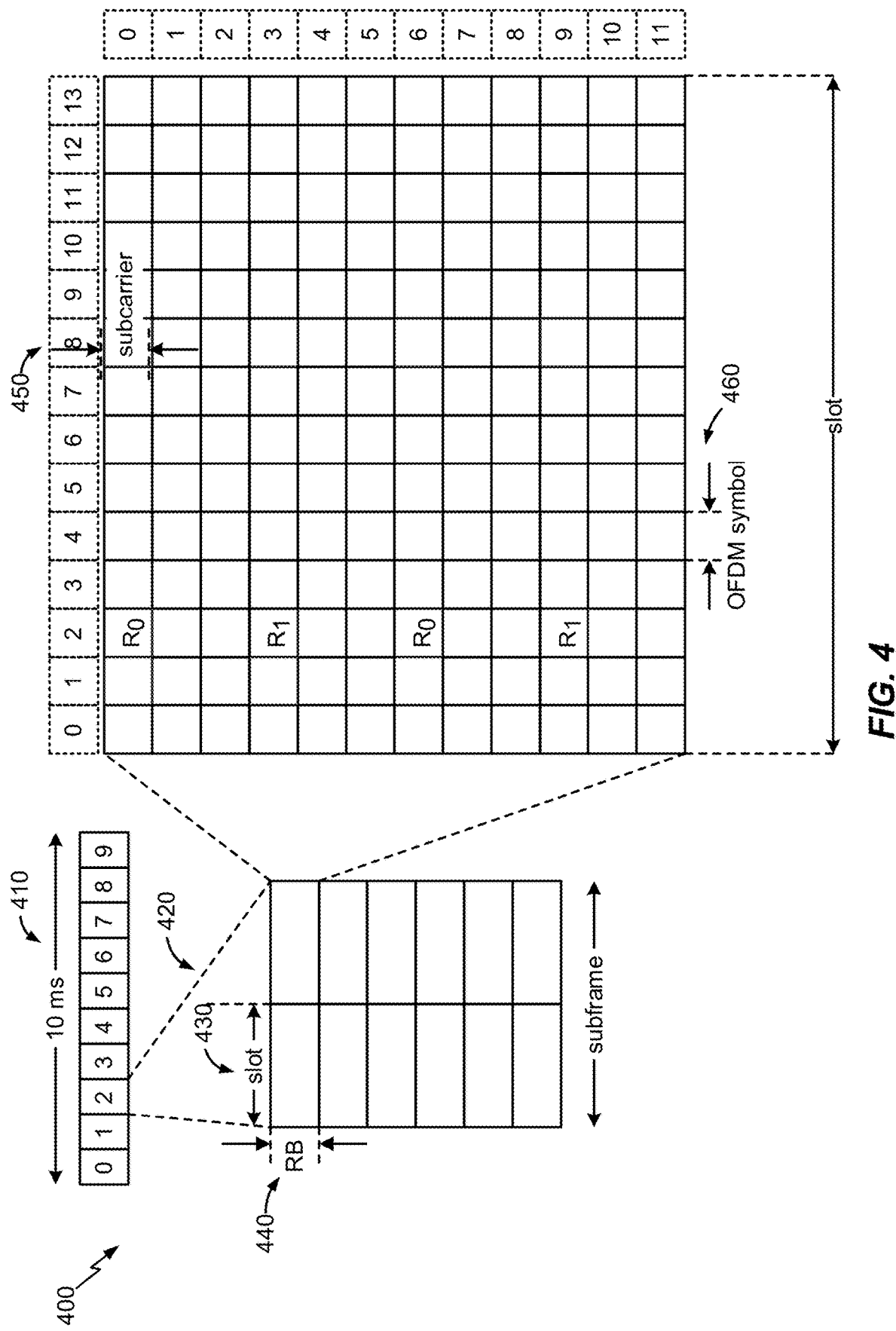
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 illustrates an example of a downlink frame structure 400 according to aspects of the disclosure. However, as those skilled in the art will readily appreciate, the frame structure for any particular application may be different depending on any number of factors. In FIG. 4, time is represented horizontally (e.g., on the X axis) with time increasing from left to right, while frequency is represented vertically (e.g., on the Y axis) with frequency increasing (or decreasing) from bottom to top. In the time domain, a frame 410 (10 ms) is divided into 10 equally sized subframes 420 (1 ms). Each subframe 420 includes two consecutive time slots 430 (0.5 ms).

A resource grid may be used to represent two time slots 430, each time slot 430 including one or more resource blocks (RBs) 440 in the frequency domain (also referred to as "physical resource blocks" or "PRBs"). In LTE, and in some cases NR, a resource block 440 contains 12 consecutive subcarriers 450 in the frequency domain and, for a normal cyclic prefix (CP) in each OFDM symbol 460, 7 consecutive OFDM symbols 460 in the time domain. A resource of one OFDM symbol length in the time domain and one subcarrier in the frequency domain (represented as a block of the resource grid) is referred to as a resource element (RE). As such, in the example of FIG. 4, there are 84 resource elements in a resource block 440.

LTE, and in some cases NR, utilize OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 450, which are also commonly referred to as tones, bins, etc. Each subcarrier 450 may be modulated with data. In general, modulation symbols are sent in the frequency domain with OFDM and in the time domain with SC-FDM. The spacing between adjacent subcarriers 450 may be fixed, and the total number of subcarriers 450 (K) may be dependent on the system bandwidth. For example, the spacing of the subcarriers 450 may be 15 kHz and the minimum resource allocation (resource block) may be 12 subcarriers 450 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (µs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

With continued reference to FIG. 4, some of the resource elements, indicated as $R_0$ and $R_1$, include a downlink reference signal (DL-RS). The DL-RS may include cell-specific RS (CRS) (also sometimes called common RS) and UE-specific RS (UE-RS). UE-RS are transmitted only on the resource blocks 440 upon which the corresponding physical downlink shared channel (PDSCH) is mapped. The number of bits carried by each resource element depends on the modulation scheme. Thus, the more resource blocks 440 that a UE receives and the higher the modulation scheme, the higher the data rate for the UE.

In an aspect, the DL-RS may be positioning reference signals (PRS). A base station may transmit radio frames (e.g., radio frames 410), or other physical layer signaling sequences, supporting PRS signals according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource ID in a PRS resource set is associated with a single beam transmitted from a single TRP (where a TRP may transmit one or more beams). That is, each PRS resource of a PRS resource set may be transmitted on a different beam, and as such, a "PRS resource" can also be referred to as a "beam." Note that this does not have any implications on whether the TRPs and the beams on which PRS are transmitted are known to the UE. A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS) in 5G, transmitter reference signals (TRS), cell-specific reference signals (CRS), channel state information reference signals (CSI-RS), primary synchronization signals (PSS), secondary synchronization signals (SSS), SSB, etc.

Figure 5:
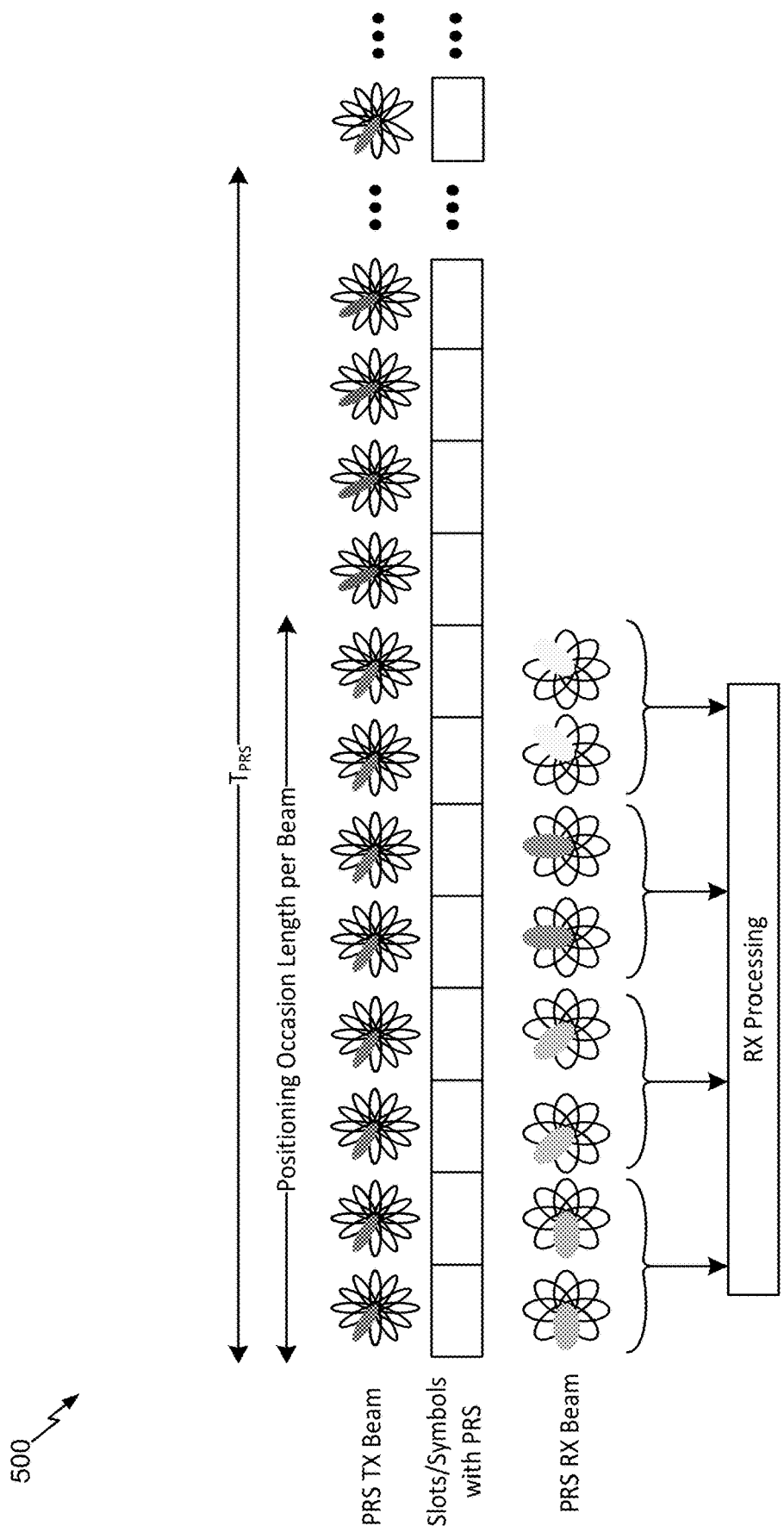
FIG. 5 is a diagram illustrating an exemplary technique for determining a position of a UE using information obtained from a plurality of base stations.

FIG. 5 illustrates exemplary DL PRSs 500 being processed through a wireless communications system according to aspects of the disclosure. In FIG. 5, a PRS transmit beams are transmitted by a cell (or transmission reception point (TRP)) over a series of beam-specific positioning occasions on respective slots/symbols during a positioning session ($T_{PRS}$). These PRS transmit beams are received as PRS receive beams at a UE, and then processed (e.g., various positioning measurements are made by the UE, etc.).

Figure 6:
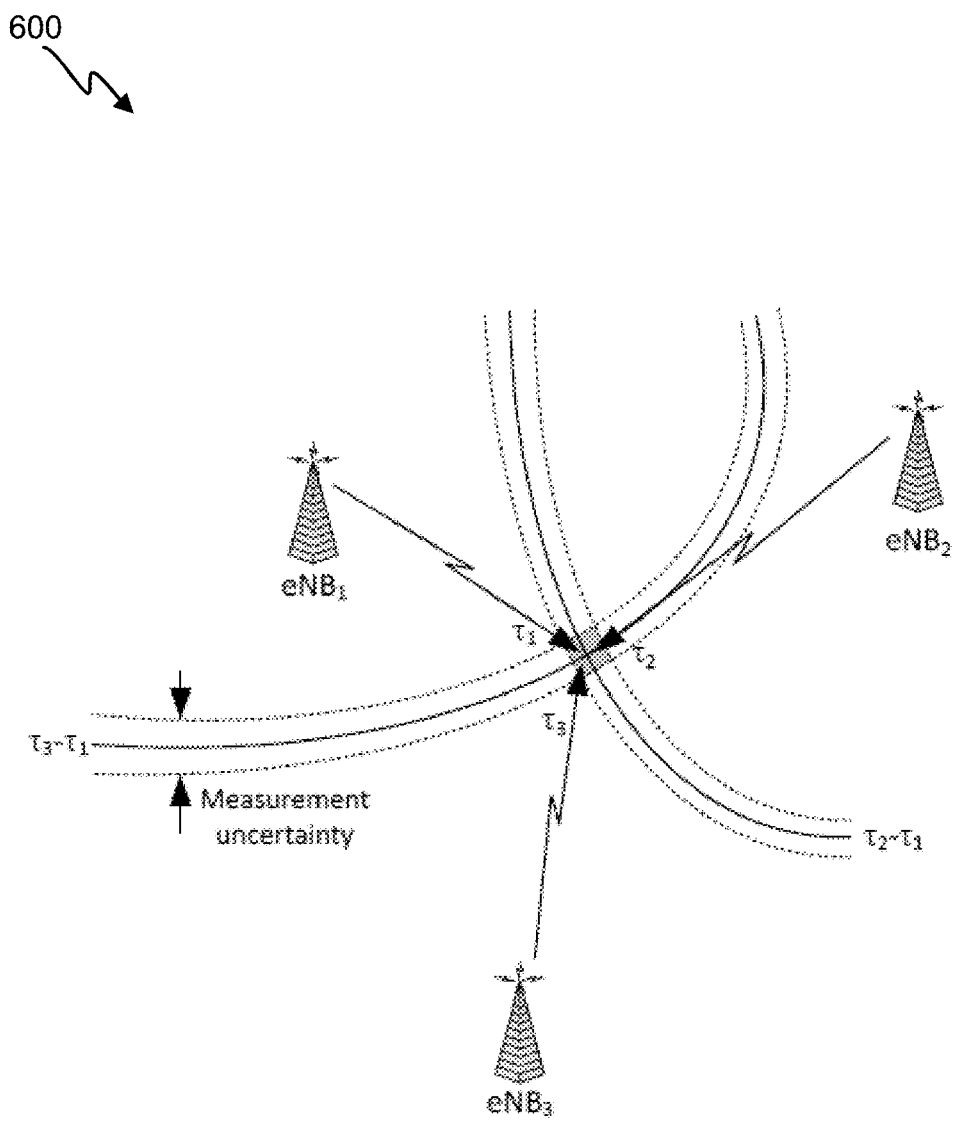
FIG. 6 is a diagram showing exemplary timings of round-trip-time (RTT) measurement signals exchanged between a base station and a UE, according to aspects of the disclosure.

FIG. 6 illustrates an exemplary wireless communications system 600 according to aspects of the disclosure. In FIG. 6, $eNB_1$, $eNB_2$ and $eNB_3$ are synchronized with each other, such that TOA (e.g., TDOA) measurements (denoted as $T_1$, $T_2$ and $T_3$) can be used to generate a positioning estimate for a UE. Multiple TDOA measurements may be used for triangulation (e.g., 4 or more cells or eNBs). In TDOA-based positioning schemes, network synchronization error is the main bottleneck in terms of positioning accuracy.

Another positioning technique that requires cell (or satellite) synchronization is based on Observed Time Difference Of Arrival (OTDOA). One example OTDOA-based positioning scheme is GPS, which is limited to an accuracy of 50-100 ns (e.g., 15-30 meters).

In NR, there is no requirement for precise timing synchronization across the network. Instead, it is sufficient to have coarse time-synchronization across gNBs (e.g., within a cyclic prefix (CP) duration of the OFDM symbols). RTT-based methods generally only need coarse timing synchronization, and as such, are a preferred positioning method in NR.

In a network-centric RTT estimation, the serving base station (e.g., base station 102) instructs the UE (e.g., UE 104) to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., location server 230, LMF 270). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS, UL-PRS) to the one or more base stations (e.g., when instructed by its serving base station) and may include the difference $T_{Rx \to Tx}$ (e.g., $T_{Rx \to Tx}$ 912 in FIG. 9) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ (e.g., $T_{Tx \to Rx}$ 922 in FIG. 9) between the transmission time of the RTT measurement signal and the ToA of the RTT response to the UE-reported difference $T_{Rx \to Tx}$ (e.g., $T_{Rx \to Tx}$ 912 in FIG. 9), the base station can deduce the propagation time between the base station and the UE, from which it can then determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

Figure 7:
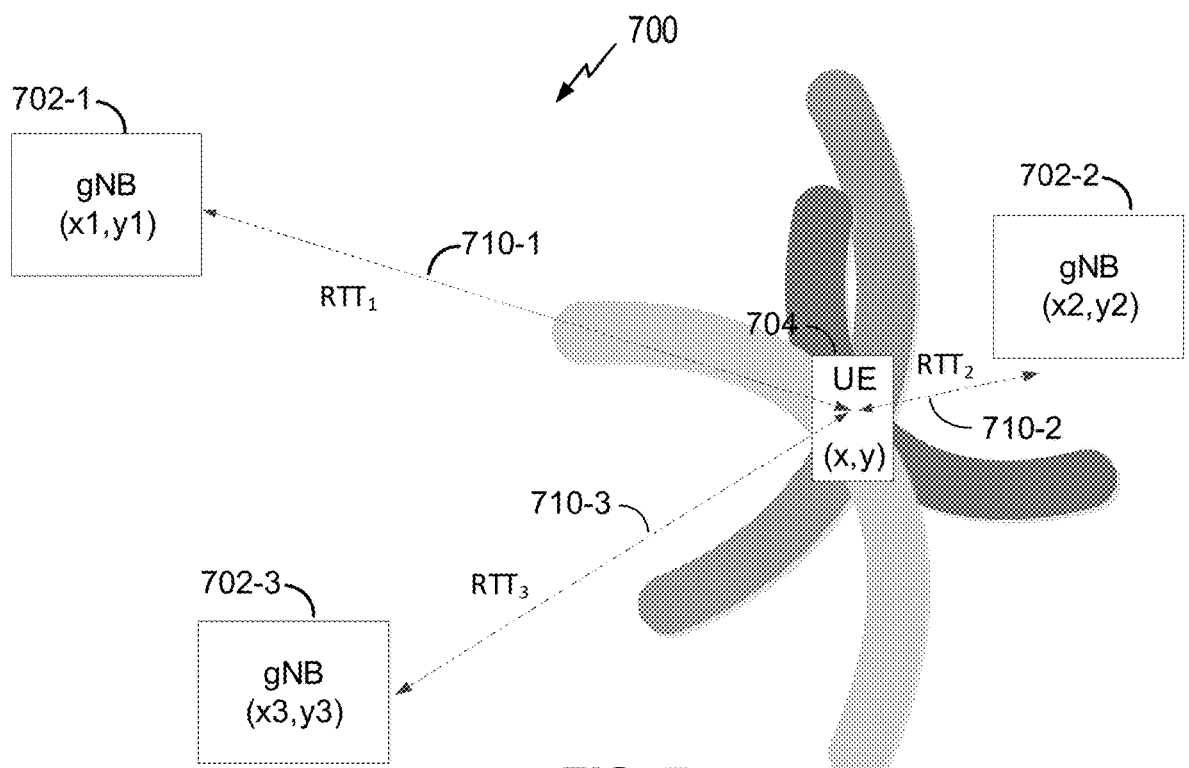
FIG. 7 illustrates an exemplary wireless communications system according to aspects of the disclosure.

FIG. 7 illustrates an exemplary wireless communications system 700 according to aspects of the disclosure. In the example of FIG. 7, a UE 704 (which may correspond to any of the UEs described herein) is attempting to calculate an estimate of its position, or assist another entity (e.g., a base station or core network component, another UE, a location server, a third party application, etc.) to calculate an estimate of its position. The UE 704 may communicate wirelessly with a plurality of base stations 702-1, 702-2, and 702-3 (collectively, base stations 702, and which may correspond to any of the base stations described herein) using RF signals and standardized protocols for the modulation of the RF signals and the exchange of information packets. By extracting different types of information from the exchanged RF signals, and utilizing the layout of the wireless communications system 700 (i.e., the base stations' locations, geometry, etc.), the UE 704 may determine its position, or assist in the determination of its position, in a predefined reference coordinate system. In an aspect, the UE 704 may specify its position using a two-dimensional coordinate system; however, the aspects disclosed herein are not so limited, and may also be applicable to determining positions using a three-dimensional coordinate system, if the extra dimension is desired. Additionally, while FIG. 7 illustrates one UE 704 and three base stations 702, as will be appreciated, there may be more UEs 704 and more base stations 702.

To support position estimates, the base stations 702 may be configured to broadcast reference RF signals (e.g., PRS, NRS, CRS, TRS, CSI-RS, PSS, SSS, etc.) to UEs 704 in their coverage area to enable a UE 704 to measure characteristics of such reference RF signals. For example, the UE 704 may measure the ToA of specific reference RF signals (e.g., PRS, NRS, CRS, CSI-RS, etc.) transmitted by at least three different base stations 702 and may use the RTT positioning method to report these ToAs (and additional information) back to the serving base station 702 or another positioning entity (e.g., location server 230, LMF 270).

In an aspect, although described as the UE 704 measuring reference RF signals from a base station 702, the UE 704 may measure reference RF signals from one of multiple cells supported by a base station 702. Where the UE 704 measures reference RF signals transmitted by a cell supported by a base station 702, the at least two other reference RF signals measured by the UE 704 to perform the RTT procedure would be from cells supported by base stations 702 different from the first base station 702 and may have good or poor signal strength at the UE 704.

In order to determine the position (x, y) of the UE 704, the entity determining the position of the UE 704 needs to know the locations of the base stations 702, which may be represented in a reference coordinate system as $(x_k, y_k)$, where k=1, 2, 3 in the example of FIG. 7. Where one of the base stations 702 (e.g., the serving base station) or the UE 704 determines the position of the UE 704, the locations of the involved base stations 702 may be provided to the serving base station 702 or the UE 704 by a location server with knowledge of the network geometry (e.g., location server 230, LMF 270). Alternatively, the location server may determine the position of the UE 704 using the known network geometry.

Either the UE 704 or the respective base station 702 may determine the distance ($d_k$, where k=1, 2, 3) between the UE 704 and the respective base station 702. In an aspect, determining the RTT 710 of signals exchanged between the UE 704 and any base station 702 can be performed and converted to a distance ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 704 and the base stations 702 are the same. However, such an assumption may not be true in practice.

Once each distance $d_k$ is determined, the UE 704, a base station 702, or the location server (e.g., location server 230, LMF 270) can solve for the position (x, y) of the UE 704 by using a variety of known geometric techniques, such as, for example, trilateration. From FIG. 7, it can be seen that the position of the UE 704 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 704 from the location of a base station 702). The intersection of the two directions at or near the point (x, y) can provide another estimate of the location for the UE 704.

A position estimate (e.g., for a UE 704) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 8:
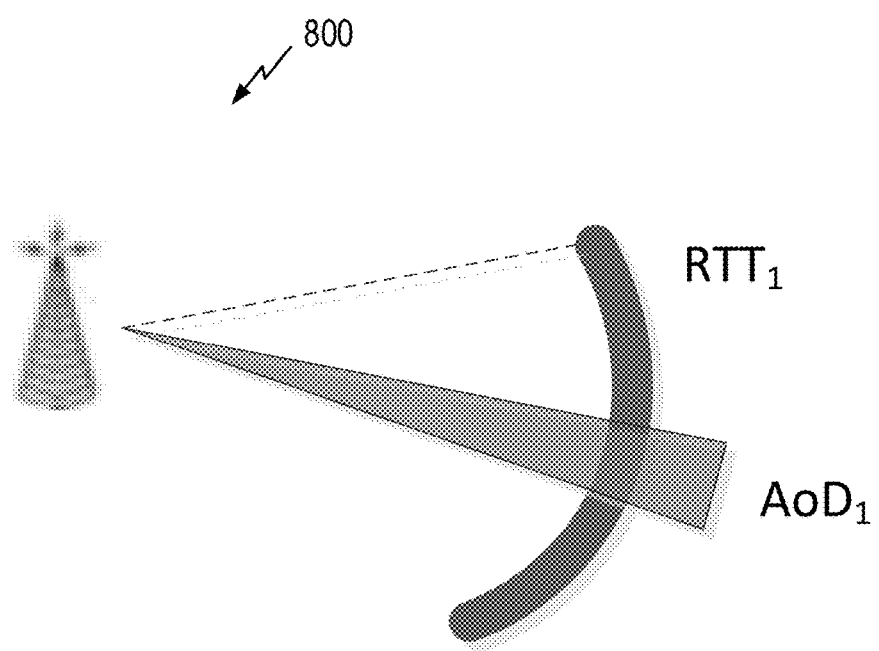
FIG. 8 illustrates an exemplary wireless communications system according to aspects of the disclosure.

FIG. 8 illustrates an exemplary wireless communications system 800 according to aspects of the disclosure. While FIG. 7 depicts an example of a multi-cell RTT positioning scheme, FIG. 8 depicts an example of a single-cell RTT positioning scheme. In FIG. 8, $RTT_1$ is measured along with an $AoD_1$ associated with a beam on which a DL PRS is transmitted from a cell to a UE. The overlapping region of the $RTT_1$ and $AoD_1$ depicted in FIG. 9 provides a coarse location estimate for the associated UE.

Figure 9:
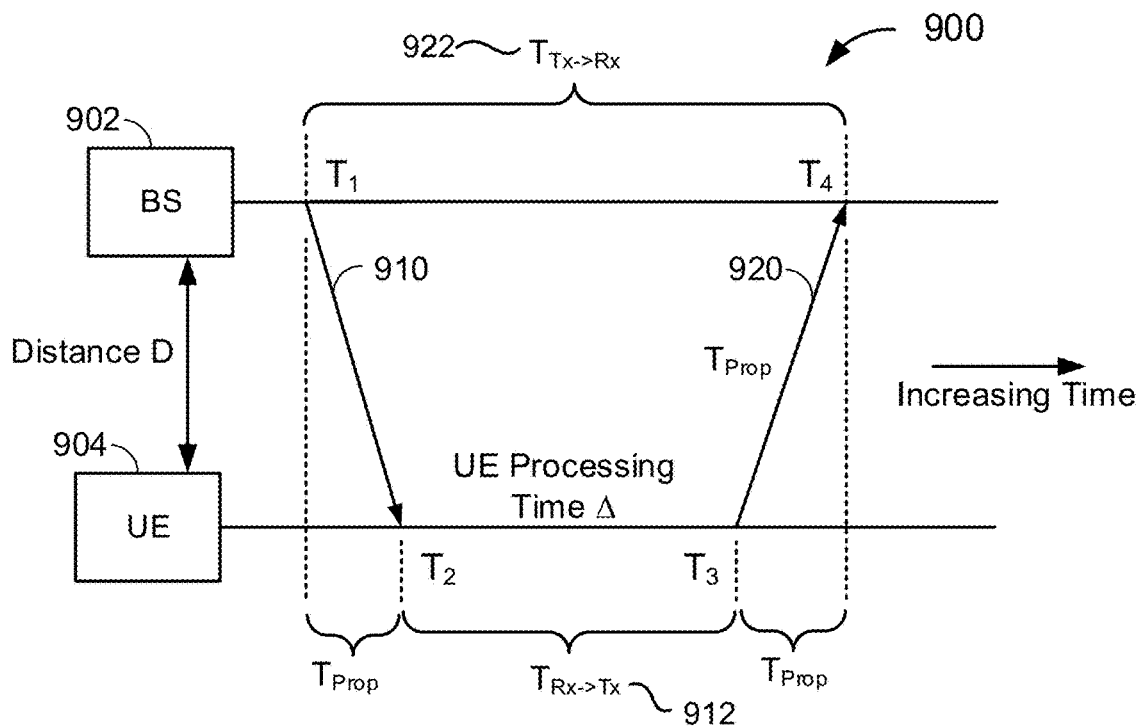
FIG. 9 is a diagram showing exemplary timings of RTT measurement signals exchanged between a base station and a UE according to aspects of the disclosure.

FIG. 9 is a diagram 900 showing exemplary timings of RTT measurement signals exchanged between a base station 902 (e.g., any of the base stations described herein) and a UE 904 (e.g., any of the UEs described herein), according to aspects of the disclosure. In the example of FIG. 9, the base station 902 sends an RTT measurement signal 910 (e.g., PRS, NRS, CRS, CSI-RS, etc.) to the UE 904 at time $T_1$. The RTT measurement signal 910 has some propagation delay $T_{Prop}$ as it travels from the base station 902 to the UE 904. At time $T_2$ (the ToA of the RTT measurement signal 910 at the UE 904), the UE 904 receives/measures the RTT measurement signal 910. After some UE processing time, the UE 904 transmits an RTT response signal 920 at time $T_3$. After the propagation delay $T_{Prop}$, the base station 902 receives/measures the RTT response signal 920 from the UE 904 at time $T_4$ (the ToA of the RTT response signal 920 at the base station 902).

In order to identify the ToA (e.g., $T_2$) of a reference signal (e.g., an RTT measurement signal 910) transmitted by a given network node (e.g., base station 902), the receiver (e.g., UE 904) first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may chose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

The RTT response signal 920 may explicitly include the difference between time $T_3$ and time $T_2$ (i.e., $T_{Rx \to Tx}$ 912). Alternatively, it may be derived from the timing advance (TA), i.e., the relative UL/DL frame timing and specification location of UL reference signals. (Note that the TA is usually the RTT between the base station and the UE, or double the propagation time in one direction.) Using this measurement and the difference between time $T_4$ and time $T_1$ (i.e., $T_{Tx \to Rx}$ 922), the base station 902 (or other positioning entity, such as location server 230, LMF 270) can calculate the distance to the UE 904 as:

$$d = \frac{1}{2c}(T_{Tx \to Rx} - T_{Rx \to Tx}) = \frac{1}{2c}(T_2 - T_1) - \frac{1}{2c}(T_4 - T_3)$$

where c is the speed of light.

Figure 10:
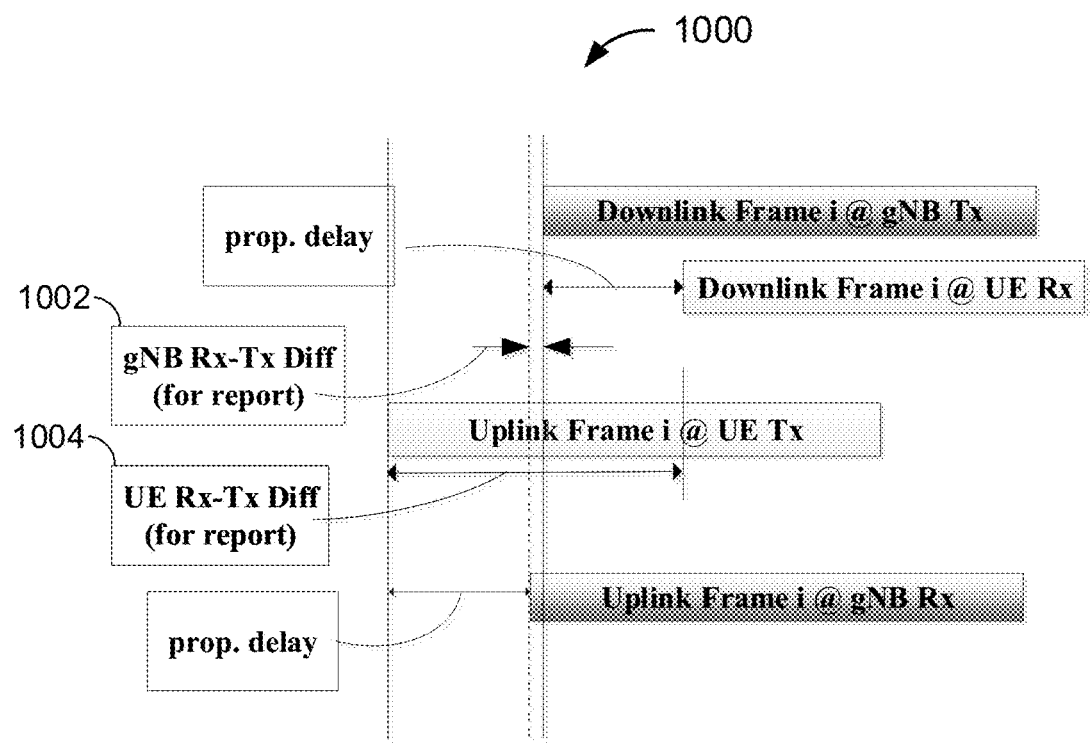
FIG. 10 illustrates is a diagram 1000 showing exemplary timings of RTT measurement signals exchanged between a base station (e.g., any of the base stations described herein) and a UE (e.g., any of the UEs described herein), according to other aspects of the disclosure.

FIG. 10 illustrates is a diagram 1000 showing exemplary timings of RTT measurement signals exchanged between a base station (e.g., any of the base stations described herein)

and a UE (e.g., any of the UEs described herein), according to other aspects of the disclosure. In particular, 1002-1004 of FIG. 10 denote portions of frame delay that are associated with a Rx-Tx differences as measured at the gNB and UE, respectively.

Figure 11:
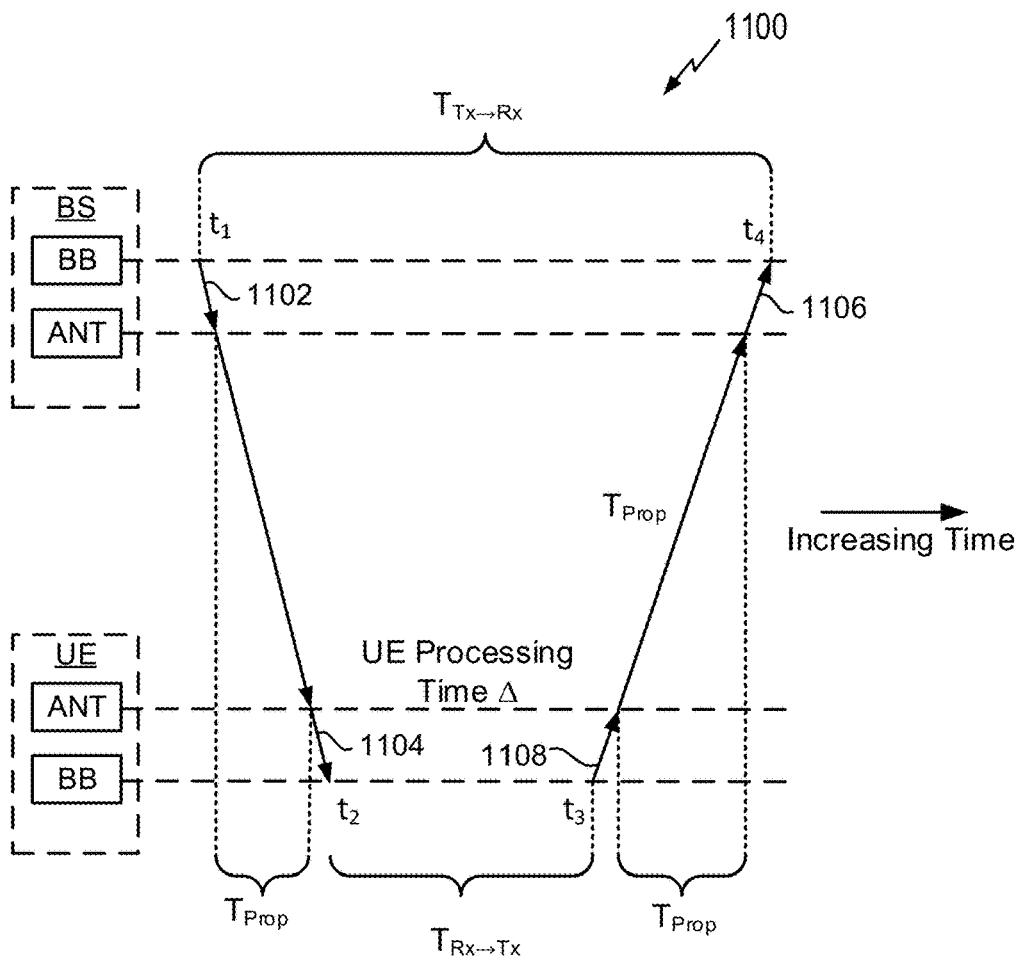
FIG. 11 illustrates a diagram 1100 showing exemplary timings of RTT measurement signals exchanged between a base station (gNB) (e.g., any of the base stations described herein) and a UE (e.g., any of the UEs described herein), according to aspects of the disclosure.

An additional source of delay or error is due to UE and gNB hardware group delay for position location. FIG. 11 illustrates a diagram 1100 showing exemplary timings of RTT measurement signals exchanged between a base station (gNB) (e.g., any of the base stations described herein) and a UE (e.g., any of the UEs described herein), according to aspects of the disclosure. FIG. 11 is similar in some respects to FIG. 9. However, in FIG. 11, the UE and gNB hardware group delay (which is primarily due to internal hardware delays between a baseband (BB) component and antenna at the UE and gNB) is shown with respect 1102-1108 (denoted as ΔRx and ΔTx). As will be appreciated, both Tx-side and Rx-side path-specific or beam-specific delays impact the RTT measurement.

Figure 12:
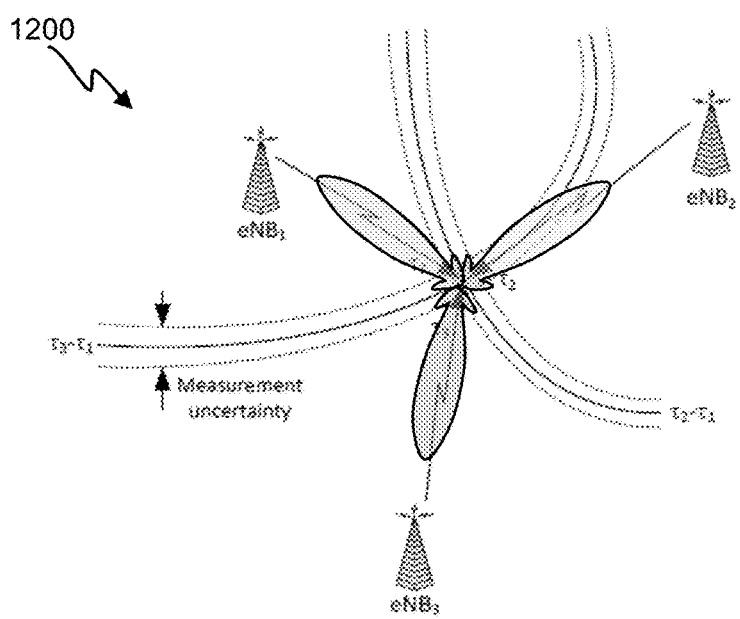
FIG. 12 illustrates an exemplary wireless communications system according to aspects of the disclosure.

FIG. 12 illustrates an exemplary wireless communications system 1200 according to aspects of the disclosure. The wireless communications system 1200 is similar to the wireless communications system 600 of FIG. 6. However, the wireless communications system 1200 further depicts the beams associated with the respective TOA (e.g., TDOA) measurements (denoted as $T_1$, $T_2$ and $T_3$). As will be appreciated, Rx-side path-specific or beam-specific delays impact the DL TDOA measurement. While not shown explicitly, Tx-side path-specific or beam-specific delays impact UL TDOA measurements in a similar manner.

The precision of positioning estimates at the UE is on UE-side is limited by how finely group-delay/timing errors can be maintained. For example, 1 ns error for ΔRx and ΔTx can lead to an approximate 2 foot limit on precision. Some 3GPP standards are targeting as a positioning precision of less than 3 m (for Rel-16) and less than 1 m (for general commercial for Rel-17). Knowledge of UE and/or gNB hardware group delay may thereby help to improve location accuracy.

As used herein, a positioning session may comprise a plurality of PRS instances, with each PRS instance comprising a PRS resource set. The PRS resource set in turn comprises a plurality of PRS resources. For example, in some implementations, a positioning session may span around 20 seconds, whereas each PRS instance may span around 160 ms. DL PRS resources may be repeated to facilitate Rx beam sweeping across different repetitions, combining gains for coverage extension, and/or intra-instance muting. In some designs, PRS configurations can support a number of repetition counts (PRS-ResourceRepetitionFactor) and a number of time gaps (PRS-ResourceTimeGap), as shown in Table 2:

TABLE 2

| Parameter | Functionality |
| --- | --- |
| PRS-ResourceRepetitionFactor | Number of times each PRS Resource is repeated for a single instance of the PRS Resource Set<br>Values: 1, 2, 4, 6, 8, 16, 32 |
| PRS-ResourceTimeGap | Offset in units of slots between two repeated instances of a DL PRS Resource corresponding to the same PRS Resource ID within a single instance of the DL PRS Resource Set<br>Values: 1, 2, 4, 8, 16, 32 |

Figures 13, 14:
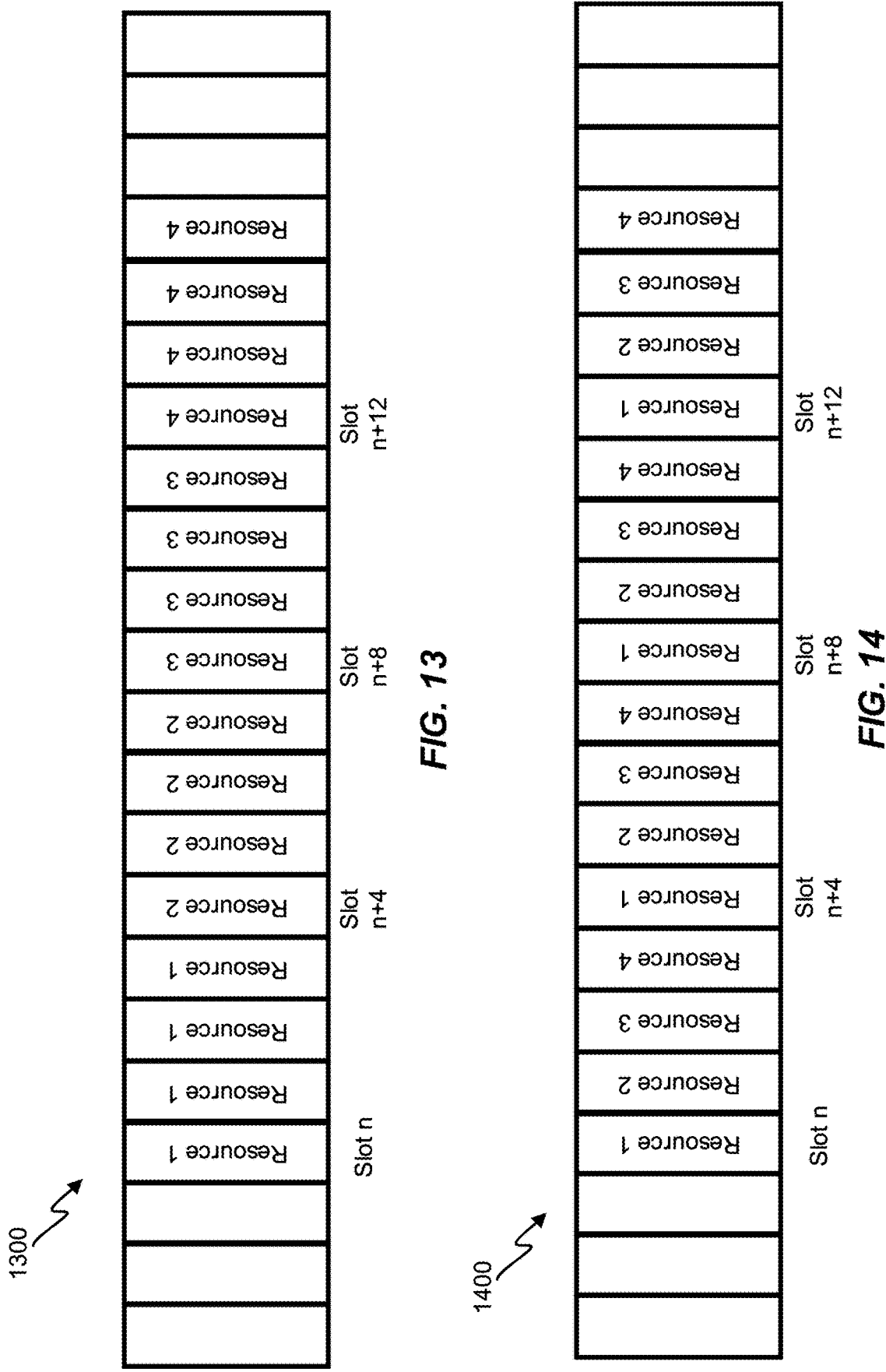
FIG. 13 illustrates a PRS resource distribution in accordance with an embodiment of the disclosure.
FIG. 14 illustrates a PRS resource distribution in accordance with another embodiment of the disclosure.

FIG. 13 illustrates a PRS resource distribution 1300 in accordance with an embodiment of the disclosure. The PRS resource distribution 1300 reflects a DL-PRS Resource set with 4 resources, a PRS-ResourceRepetitionFactor of 4, and a PRS-ResourceTimeGap of 1 slot.

FIG. 14 illustrates a PRS resource distribution 1400 in accordance with another embodiment of the disclosure. The PRS resource distribution 1400 reflects a DL-PRS Resource set with 4 resources, a PRS-ResourceRepetitionFactor of 4, and a PRS-ResourceTimeGap of 4 slots.

Figure 15:
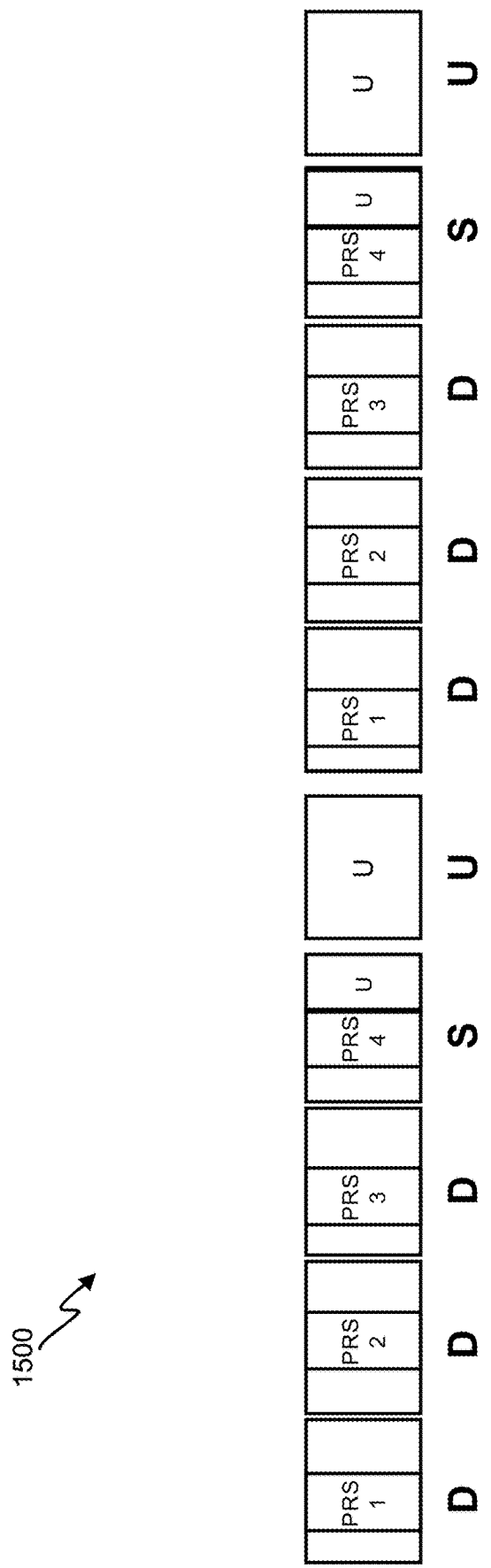
FIG. 15 illustrates a configuration of an exemplary PRS instance in accordance with an embodiment of the disclosure.

FIG. 15 illustrates a configuration of an exemplary PRS instance 1500 in accordance with an embodiment of the disclosure. The PRS instance 1500 is configured with FR1 TDD, 8 PRS resources per TRP, 30 KHz, and a DDDSU format (2.5 msec). For a PRS resource with comb-6/6-symbols with a repetition factor of 4, all 8 PRS resources could span across a 2.5*8=20 msec time-window. Assuming a PRS resource is ON for 1 out of X slots, the above 20 msec "PRS instance" would fit all beams of 6*X beams from different TRPs fully muted, and the remaining non-orthogonal (e.g., X=4 would mean the UE can sample all 8 beams of 24 TRPs fully muted). In FR2, the time span of a PRS instance can easily span across a time window of 40 msec.

Figure 16:
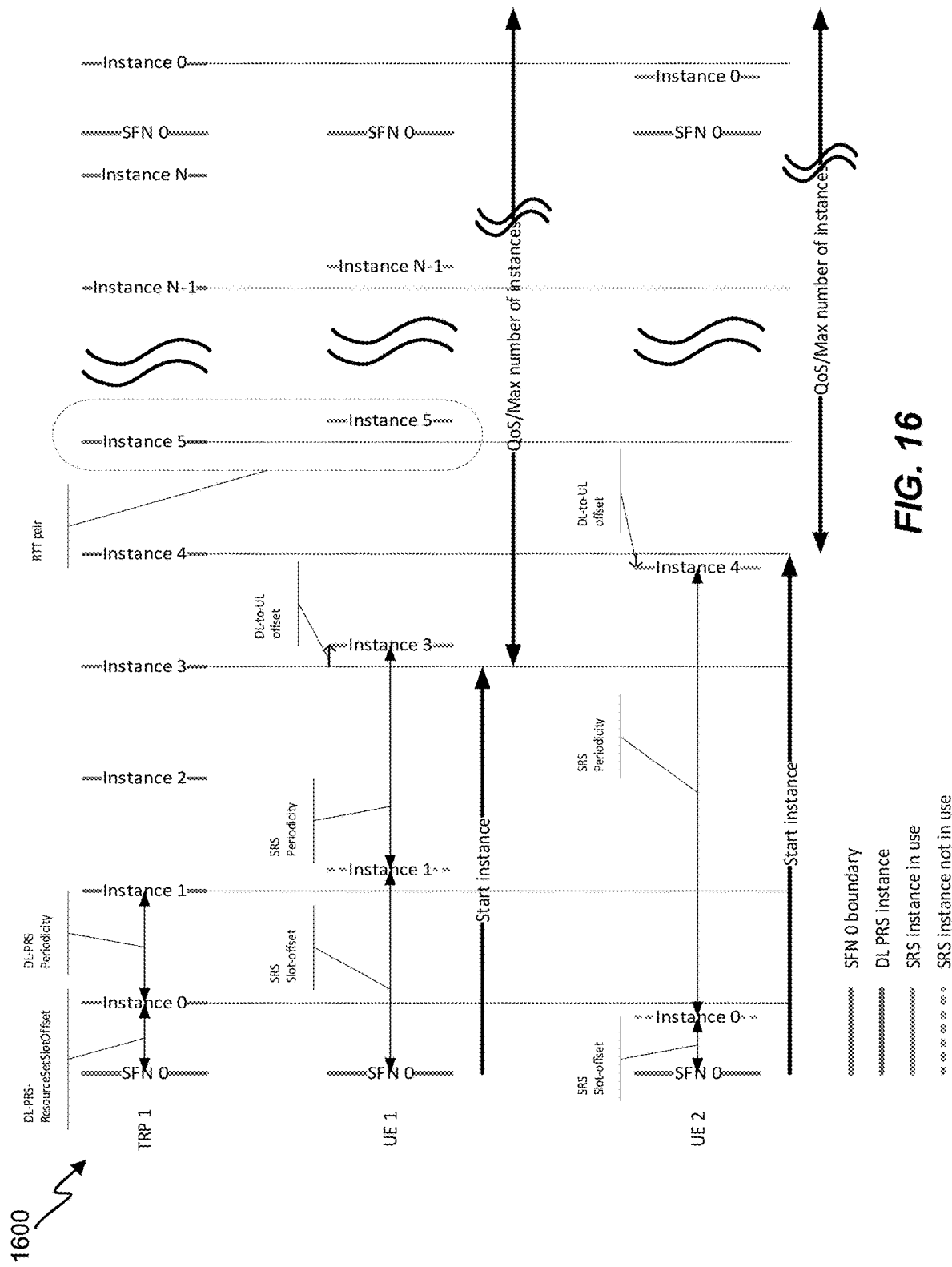
FIG. 16 illustrates a positioning session comprising a series of PRS instances in accordance with an embodiment of the disclosure.

FIG. 16 illustrates a positioning session 1600 comprising a series of PRS instances in accordance with an embodiment of the disclosure. Ideally, all measurements used in generating a positioning fix should be made concurrently. If measurements are performed at different points in time for generating a positioning fix, UE motion as well as changes to UE clock and gNB clock(s) may result in measurement errors that ultimately can produce position errors. For example, a 10 part-per-billion (ppb) UE clock drift can produce a 1 s*10 ns/s=10 ns~3 m measurement error for two measurements taken 1 second apart. UE motion, UE clock drift and gNB clock drift can all result in significant errors for measurements that are conducted apart in time but are all used to generate the same position fix. In some designs, the core measurement and performance requirements for UE Rx-Tx time difference applies if the configured SRS-Slot-offset and SRS-Periodicity parameters for SRS resource for positioning are such that any SRS transmission is within [−X, X] msec of at least one DL PRS resource from each of the TRPs in the assistance data (e.g., in some designs, X=25 msec).

Figure 17:
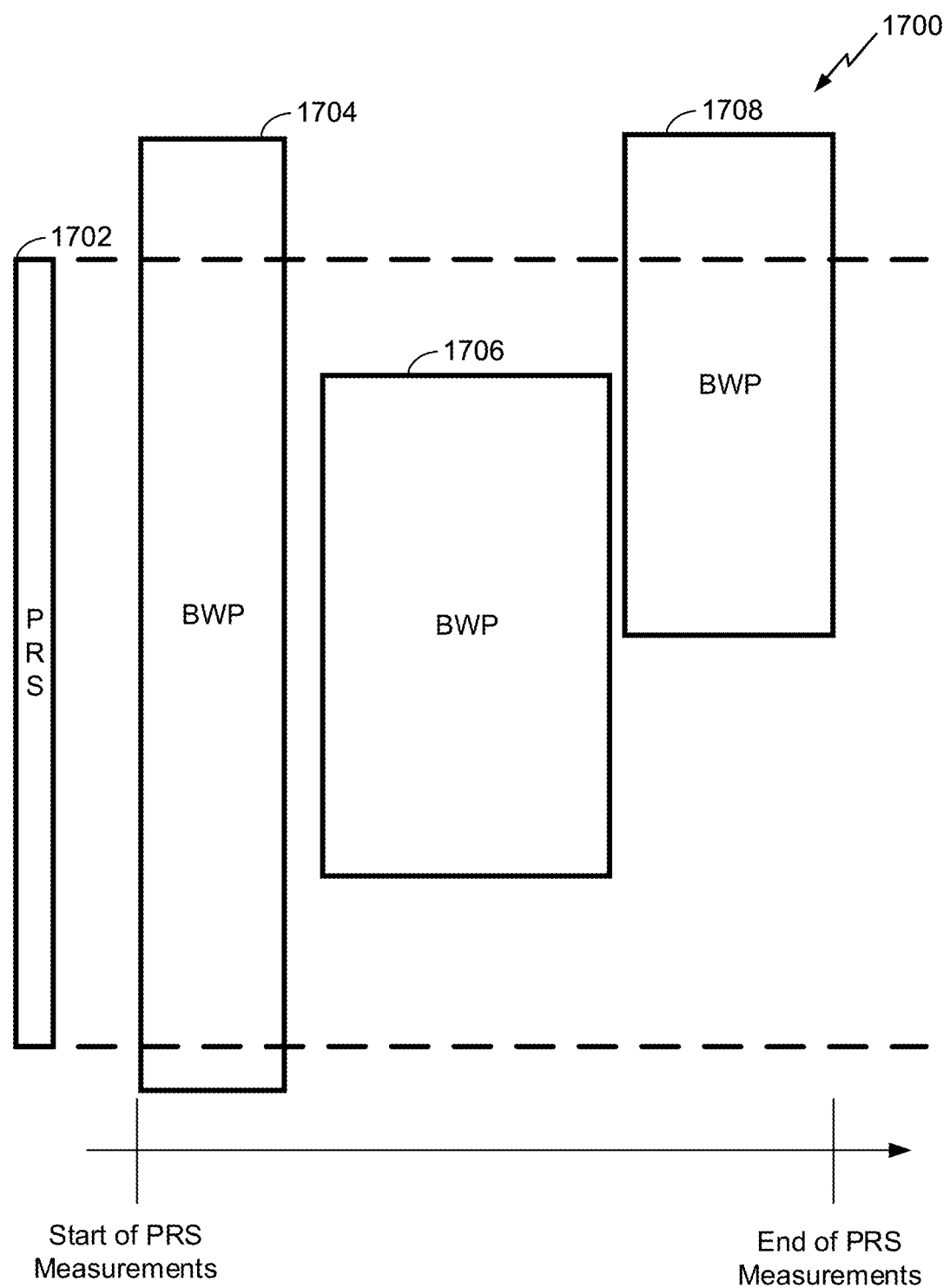
FIG. 17 illustrates active bandwidth part (BWP) transitions for a UE during a positioning session in accordance with an embodiment of the disclosure.

FIG. 17 illustrates active bandwidth part (BWP) transitions 1700 for a UE during a positioning session in accordance with an embodiment of the disclosure. As shown in FIG. 17, a PRS bandwidth 1702 associated with PRS resources of one or more PRS resource sets across one or more PRS instances overlaps with an initial active BWP 1704. However, the active BWP then transitions to BWP 1706 and then to BWP 1708, neither of which fully overlap with the PRS bandwidth 1702.

In some designs, PRS-RSTD and PRS-RSRP measurement requirements apply when UE's active DL BWP is totally unchanged (e.g., its bandwidth, numerology, DRX configuration, etc.) during a positioning session. In some designs, UE Rx-Tx time difference measurement requirements apply when UE's active DL and UL BWP is totally unchanged (e.g., its bandwidth, numerology, DRX configuration, etc.) during a positioning session.

However, not all BWP changes may substantively impact an accuracy of a positioning session. In some embodiments, with respect to the active BWP switching and accuracy/measurement requirements for positioning measurements (e.g., RSTD, RSRP, Rx-Tx, etc.) when measurement gaps are not configured (e.g., as in FIG. 13), the accuracy requirements may be defined for a positioning measurement for measurements that have been derived using resources within a time-domain period and assuming no change has occurred to a particular set of BWP parameters during that time-domain period. In some aspects, the set of parameters may encompass all BWP parameters, such that any active BWP transition is not allowed during the time-domain period while maintaining the accuracy requirements. However, in other aspects, the set of parameters may encompass a selected subset of the BWP parameters (e.g., those parameters that, if changes, will substantively impact the accuracy of a particular measurement and/or the overarching positioning fix), such that some active BWP transitions are allowed during the time-domain period while maintaining the accuracy requirements. As will be described below in more detail, both the time-domain period and the set of parameters are configurable and can be tuned to accommodate a positioning accuracy requirement for a particular application. Determination of active BWP transitions during such time-domain periods of positioning sessions may provide various technical advantages, such as adaptable accuracy requirements, improved accuracy and/or knowledge of potential positioning errors due to BWP switch, and so on.

Figure 18:
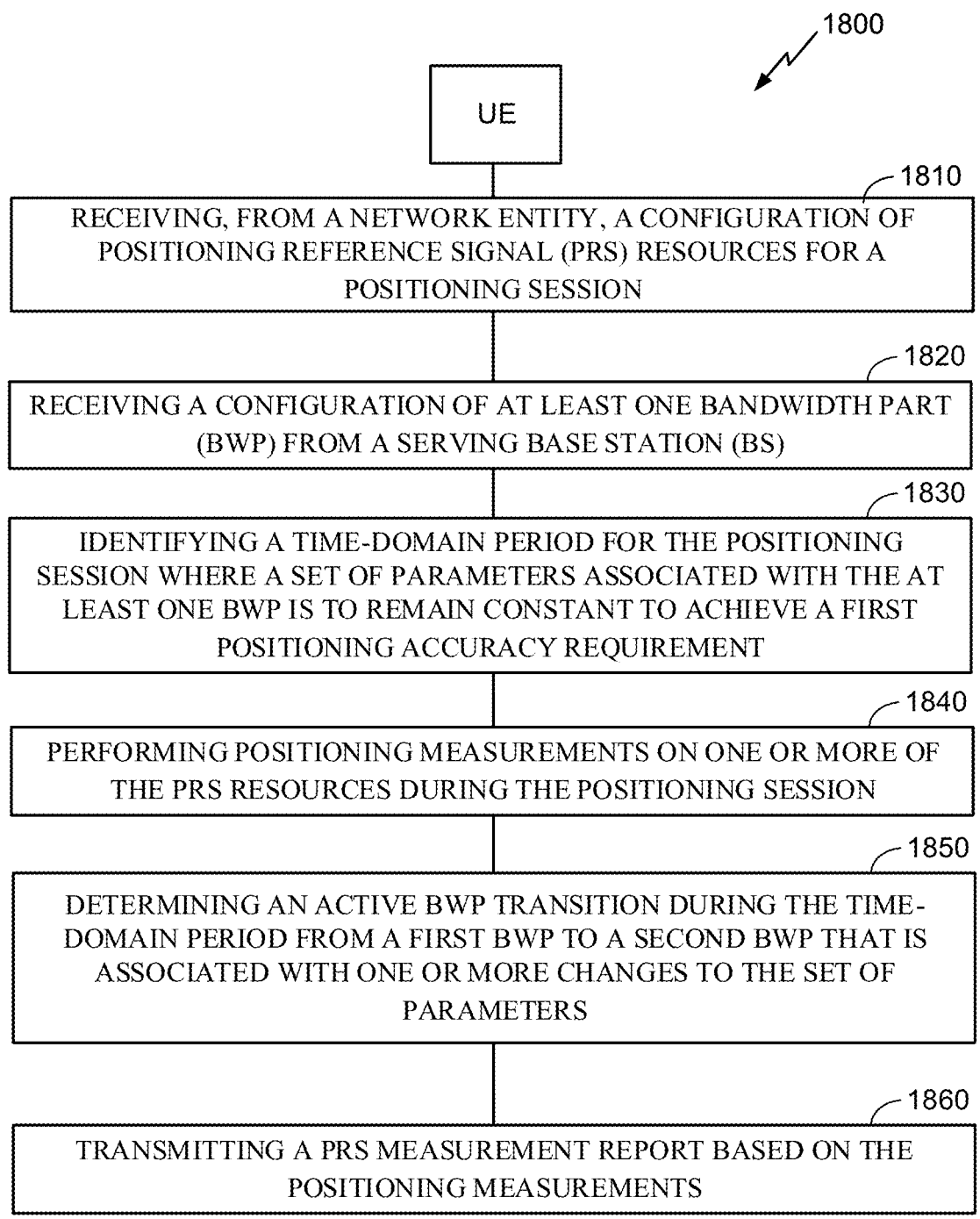
FIG. 18 illustrates an exemplary method of wireless communication, according to aspects of the disclosure.

FIG. 18 illustrates an exemplary method 1800 of wireless communication, according to aspects of the disclosure. The method 1800 may be performed by a UE (e.g., any of the UEs described herein).

At 1810, the UE (e.g., receiver 312, etc.) receives, from a network entity, a configuration of positioning reference signal (PRS) resources for a positioning session. In some designs, the network entity corresponds to a serving base station of the UE. In other designs, the network entity may correspond to a core network component.

At 1820, the UE (e.g., receiver 312, etc.) receives a configuration of at least one bandwidth part (BWP) from a serving base station (BS). If the at least one BWP includes multiple BWPs (e.g., due to an active BWP transition), the receiving of 1820 may comprise multiple receive operations during the positioning session.

At 1830, the UE (e.g., receiver 312, memory component 338, processing system 332, positioning component 344, etc.) identifies a time-domain period for the positioning session where a set of parameters associated with the at least one BWP is to remain constant to achieve a first positioning accuracy requirement. In some designs, the time-domain period and the set of parameters may be application-specific and tailored to satisfy the first positioning accuracy requirement.

At 1840, the UE (e.g., receiver 312, memory component 338, processing system 332, positioning component 344, etc.) performs positioning measurements on the one or more of the PRS resources during the positioning session. At 1850, the UE (e.g., processing system 332, positioning component 344, etc.) determines an active BWP transition during the time-domain period from a first BWP to a second BWP that is associated with one or more changes to the set of parameters. At 1860, the UE (e.g., transmitter 310) transmits a PRS measurement report based on the positioning measurements. In some designs, a frequency of the PRS measurement report may be based on slot in which report was ready to transmit (e.g., upper layer message readiness concept), or slot in which the PRS measurement report began transmitting (e.g., more suited for lower-layer reporting such as MAC-CE or UCI-based).

Referring to FIG. 18, in some designs, some or all of the positioning session and/or the time-domain period for the positioning session where the set of parameters associated with the at least one BWP is to remain constant to achieve the first positioning accuracy requirement may be associated with (e.g., aligned with) a configured measurement gap (e.g., a configured period of time where the UE refrains from uplink transmissions and/or downlink data traffic communications to facilitate measurement of reference signals). In other designs, the positioning session and/or the time-domain period for the positioning session where the set of parameters associated with the at least one BWP is to remain constant to achieve the first positioning accuracy require may not be associated with (e.g., aligned with) a configured measurement gap. So, the entire positioning session (or the part of the positioning session that comprises the time-domain window) may be associated with a configured measurement gap, no part of the positioning session (or the part of the positioning session that comprises the time-domain window) may be associated with a configured measurement gap, or a first part of the positioning session may be associated with a configured measurement gap while another part of the positioning session may not be associated with a configured measurement gap.

Referring to FIG. 18, in some designs, the UE may optionally report an indication of the time-domain period and/or set of parameters to a network entity (e.g., a serving base station of the UE, a core network component, etc.). In this case, the network entity may take certain actions to accommodate the UE's positioning session (e.g., avoid any BWP transitions that would violate the first positioning accuracy requirement, etc.). In an example, the optional report may be part of a UE capability message. In an example, the optional report may be implemented per-band or per-frequency (e.g., FR1-specific, FR2-specific, etc.) or per-band combination.

Referring to FIG. 18, as noted above, the positioning session includes a plurality of PRS instances that include a respective PRS resource set. The time-domain period associated with the first positioning accuracy requirement may be defined across the positioning session in a variety of ways, including but not limited to:

- from an earliest PRS resource of a PRS resource set for an earliest PRS instance to a latest PRS resource of a PRS resource set for a latest PRS instance (e.g., across the entire positioning session), or
- from an earliest PRS resource of a first PRS resource set to a latest PRS resource of the first PRS resource set (e.g., same PRS resource set) or a second PRS instance (e.g., spanning multiple PRS instances, such as a number of whole PRS instances between a previous measurement report to an upcoming measurement report), or
- from an earliest PRS resource of a PRS resource set for a first PRS instance associated with a particular frequency layer (FL) to a latest PRS resource of a PRS resource set for the first PRS instance (e.g., same PRS resource set) or a second PRS instance (e.g., spanning multiple PRS instances, such as a number of whole PRS instances between a previous measurement report to an upcoming measurement report) associated with the particular FL, or
- from an earliest repetition of a PRS resource of a PRS resource set for a PRS instance to a latest repetition of the same PRS resource for the same PRS instance, or
- a specified number of slots (e.g., in case of aperiodic PRS, defining the time-domain period using slots may be particularly advantageous, although the LMF and gNB may need to coordinate to reduce uncertainties in implementation).

Referring to FIG. 18, in an example, the performing at 1840 may comprise measuring, while a first BWP is active and the set of parameters remains constant, a first subset of PRS resources. In an example, the determination at 1850 may be reported (e.g., to a network entity, such as a serving base station or core network component). In some designs, in response to the detection, the UE may relax or eliminate a target positioning accuracy requirement from the first positioning accuracy requirement and to a second positioning accuracy requirement, and then continue to measure, while the second BWP is active, a second subset of PRS resources (e.g., in accordance with the second positioning requirement accuracy requirement). In some designs, the second positioning requirement accuracy requirement may be an actual positioning requirement accuracy requirement. In other designs, the second positioning requirement accuracy requirement may be no accuracy requirement at all (e.g., the previous target positioning accuracy requirement is effectively eliminated).

Referring to FIG. 18, in response to an active BWP transition determination at 1850, in some designs, the UE may extend a duration of a first time-domain period required for deriving a set of measurements while the first BWP is active for the positioning session (e.g., to provide additional time for performing at least one positioning measurement in accordance with the first positioning accuracy requirement). For example, the first time-domain period may be extended to a second time-domain period, a duration of the second time-domain period being based on a number of times a BWP switching delay associated with the determined active BWP transition overlaps with any DL PRS resource inside the time-domain period (e.g., if more DL PRS resources were missed due to the active BWP transition, then extend the time-domain period further). In some designs, the extending is based at least in part upon whether a measurement gap is configured for the positioning session.

Referring to FIG. 18, in an example, the set of parameters monitored to facilitate the determination at 1850 may include any of the following:
 each parameter associated with the at least one BWP, such that the same BWP remains active throughout the positioning session,
 a bandwidth of the at least one BWP,
 a center part of the bandwidth of the at least one BWP,
 a bandwidth of the at least one BWP that aligns with a bandwidth associated with the plurality of PRS instances,
 a numerology of the at least one BWP,
 a DRX configuration of the at least one BWP, or
 any combination thereof.

Referring to FIG. 18, in an example, the first positioning accuracy requirement may comprise a positioning measurement accuracy requirement (e.g., RSRP, RSTD, Rx-Tx, etc.), a positioning fix accuracy requirement (e.g., 6 meters, 3 meters, 3 feet, etc.), or a combination thereof.

Figure 19:
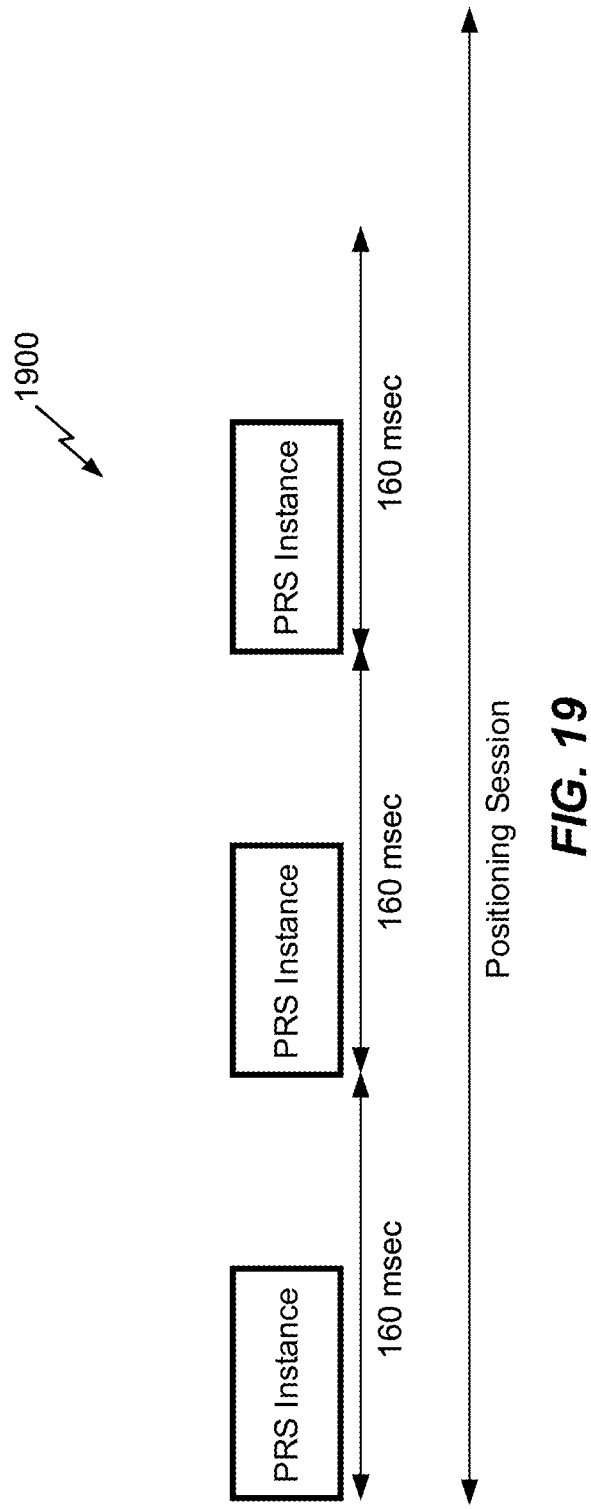
FIG. 19 illustrates PRS instances of a positioning session in accordance with an embodiment of the disclosure.

FIG. 19 illustrates PRS instances of a positioning session 1900 in accordance with an embodiment of the disclosure. In FIG. 19, there is no active BWP transition during the positioning session. Hence, no change in the set of parameters is determined (irrespective of how the set of parameters is defined) across the time-domain period (irrespective of how the time-domain period is defined).

Figure 20:
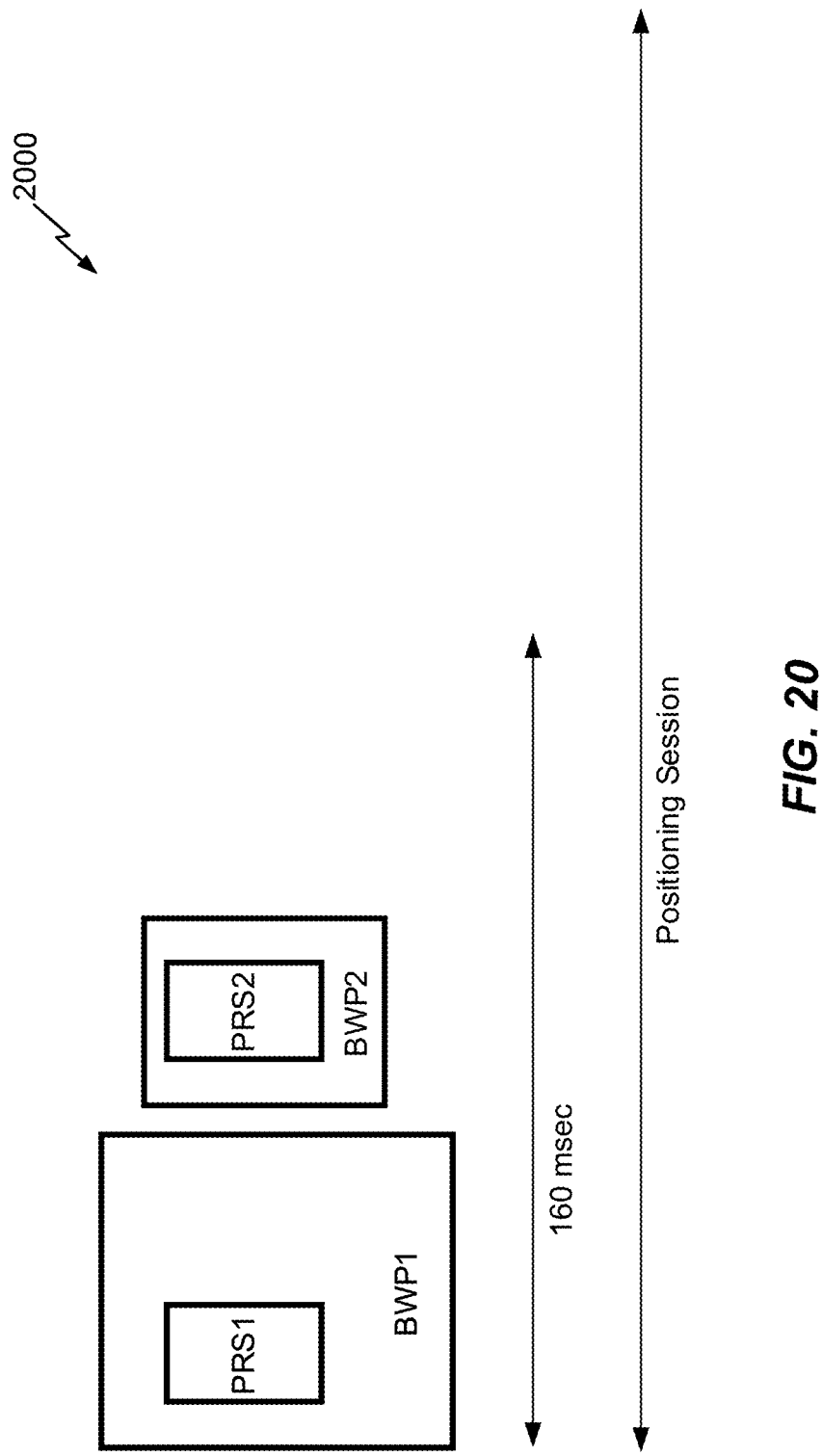
FIG. 20 illustrates an active BWP transition during a positioning session in accordance with an embodiment of the disclosure.

FIG. 20 illustrates an active BWP transition during a positioning session 2000 in accordance with an embodiment of the disclosure. In FIG. 20, an active BWP transitions from a first BWP (BWP1) to a second BWP (BWP2) during the positioning session 2000. The active BWP transition may occur during a particular PRS instance or in between PRS instances. The active BWP transition may or may not violate the first positioning accuracy requirement of 1930 depending on how the time-domain period and/or the set of parameters are defined. In this case, the PRS bandwidth overlaps with the bandwidth of both BWP1 and BWP2. So, as one example, if the set of parameters included only a bandwidth of the at least one BWP that aligns with a bandwidth associated with the plurality of PRS instances, then the active BWP transition in this case would not violate the first positioning accuracy requirement.

Figure 21:
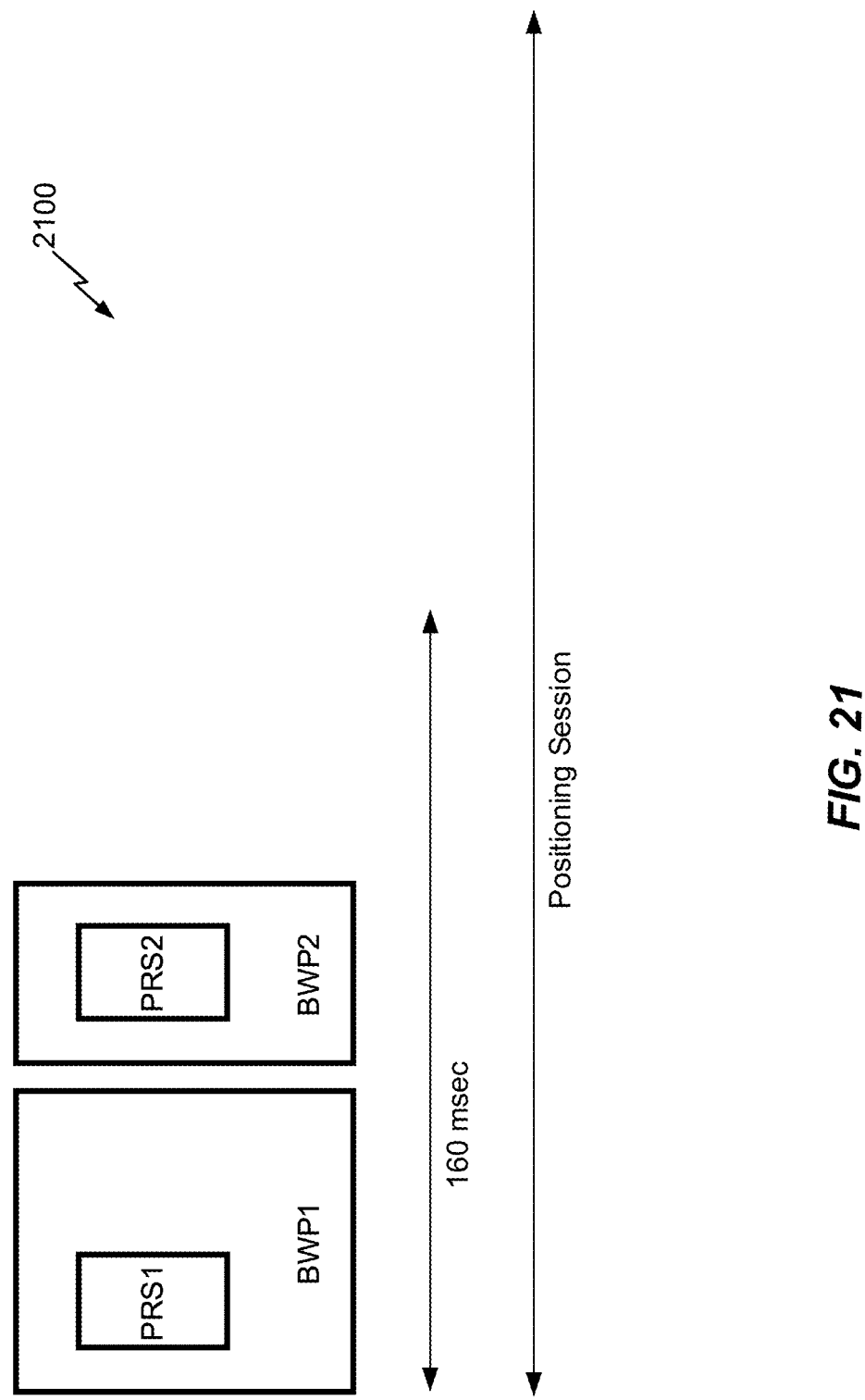
FIG. 21 illustrates an active BWP transition during a positioning session in accordance with an embodiment of the disclosure.

FIG. 21 illustrates an active BWP transition during a positioning session 2100 in accordance with an embodiment of the disclosure. In FIG. 21, an active BWP transitions from a first BWP (BWP1) to a second BWP (BWP2) during the positioning session 2000. The active BWP transition may occur during a particular PRS instance or in between PRS instances. The active BWP transition may or may not violate the first positioning accuracy requirement of 1930 depending on how the time-domain period and/or the set of parameters are defined. In this case, the bandwidths for both BWP1 and BWP2 are the same, although other parameters may be different (e.g., DRX, numerology, etc.). So, as one example, if the set of parameters included only a bandwidth of the at least one BWP, then the active BWP transition in this case would not violate the first positioning accuracy requirement.

While many of the above-noted FIGS relate to DL PRS-based positioning sessions, other embodiments of the disclosure relate to UL SRS-based positioning procedures, as will now be described.

An SRS is an uplink-only signal that a UE transmits to help the base station obtain the channel state information (CSI) for each user. Channel state information describes how an RF signal propagates from the UE to the base station and represents the combined effect of scattering, fading, and power decay with distance. The system uses the SRS for resource scheduling, link adaptation, massive MIMO, beam management, etc.

Several enhancements over the previous definition of SRS have been proposed for SRS for positioning (SRS-P), such as a new staggered pattern within an SRS resource, a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a DL RS from a neighboring TRP. Further still, one SRS resource may be transmitted outside the active bandwidth part (BWP), and one SRS resource may span across multiple component carriers. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

As noted above, sounding reference signals (SRS) in NR are UE-specific configured reference signals transmitted by the UE used for the purposes of the sounding the uplink radio channel. Similar to CSI-RS, such sounding provides various levels of knowledge of the radio channel characteristics. On one extreme, the SRS can be used at the gNB simply to obtain signal strength measurements, e.g., for the purposes of UL beam management. On the other extreme, SRS can be used at the gNB to obtain detailed amplitude and phase estimates as a function of frequency, time and space. In NR, channel sounding with SRS supports a more diverse set of use cases compared to LTE (e.g., downlink CSI acquisition for reciprocity-based gNB transmit beamforming (downlink MIMO); uplink CSI acquisition for link adaptation and codebook/non-codebook based precoding for uplink MIMO, uplink beam management, etc.).

The SRS can be configured using various options. The time/frequency mapping of an SRS resource is defined by the following characteristics.

Time duration $N_{symb}^{SRS}$—The time duration of an SRS resource can be 1, 2, or 4 consecutive OFDM symbols within a slot, in contrast to LTE which allows only a single OFDM symbol per slot.

Starting symbol location $l_0$—The starting symbol of an SRS resource can be located anywhere within the last 6 OFDM symbols of a slot provided the resource does not cross the end-of-slot boundary.

Repetition factor R—For an SRS resource configured with frequency hopping, repetition allows the same set of subcarriers to be sounded in R consecutive OFDM symbols before the next hop occurs (as used herein, a "hop" refers to specifically to a frequency hop). For example, values of R are 1, 2, 4 where $R \leq N_{symb}^{SRS}$.

Transmission comb spacing $K_{TC}$ and comb offset $k_{TC}$—An SRS resource may occupy resource elements (REs) of a frequency domain comb structure, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, ..., $K_{TC}$−1 REs. Thus, for comb spacing $K_{TC}$=2, there are 2 different combs available for multiplexing if needed, and for comb spacing $K_{TC}$=4, there are 4 different available combs.

Periodicity and slot offset for the case of periodic/semi-persistent SRS.

Sounding bandwidth within a bandwidth part.

Figure 22:
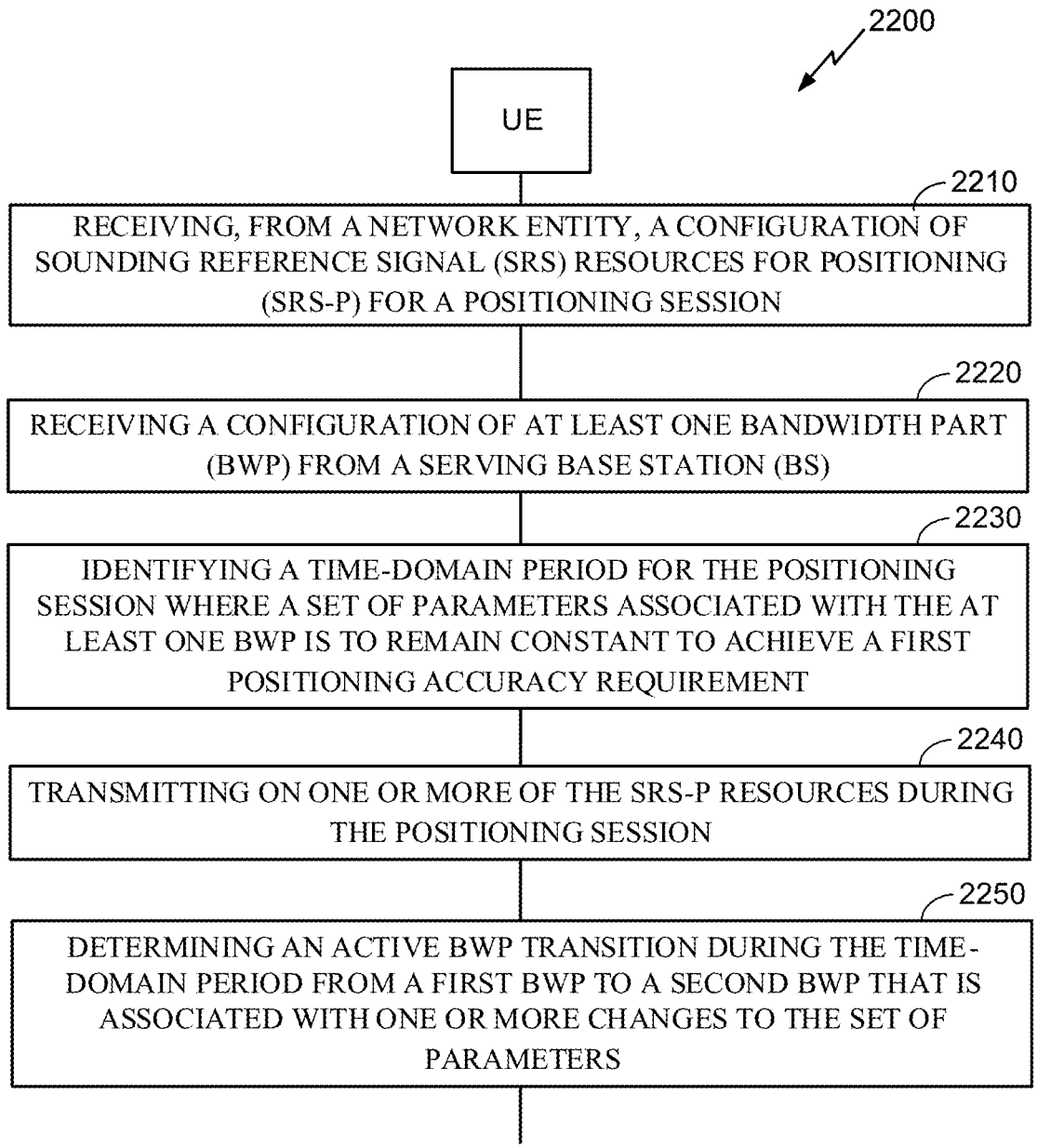
FIG. 22 illustrates an exemplary method of wireless communication, according to aspects of the disclosure.

FIG. 22 illustrates an exemplary method 2200 of wireless communication, according to aspects of the disclosure. The method 2200 may be performed by a UE (e.g., any of the UEs described herein).

At 2210, the UE (e.g., receiver 312, etc.) receives, from a network entity, a configuration of SRS resources for positioning (SRS-P) for a positioning session. In some designs, the network entity corresponds to a serving base station of the UE. In other designs, the network entity may correspond to a core network component.

At 2220, the UE (e.g., receiver 312, etc.) receives a configuration of at least one bandwidth part (BWP) from a serving base station (BS). If the at least one BWP includes multiple BWPs (e.g., due to an active BWP transition), the receiving of 2220 may comprise multiple receive operations during the positioning session.

At 2230, the UE (e.g., receiver 312, memory component 338, processing system 332, positioning component 344, etc.) identifies a time-domain period for the positioning session where a set of parameters associated with the at least one BWP is to remain constant to achieve a first positioning accuracy requirement. In some designs, the time-domain period and the set of parameters may be application-specific and tailored to satisfy the first positioning accuracy requirement. In some designs, the time-domain period and the set of parameters identified at 2230 for the UL SRS-based positioning session may be the same as the time-domain period and the set of parameters identified at 1830 for the DL PRS-based positioning session. However, in other designs, the time-domain period and the set of parameters identified at 2230 for the UL SRS-based positioning session may different from the time-domain period and the set of parameters identified at 1830 for the DL PRS-based positioning session. For example, a UE may need to keep the same BWP across a respective time-domain period for a DL PRS-based positioning session, while it may be sufficient for the UE to merely keep the same bandwidth across active BWP transitions for a UL SRS-based positioning session.

At 2240, the UE (e.g., transmitter 310) transmits on one or more of the SRS-P resources during the positioning session. At 2250, the UE (e.g., processing system 332, positioning component 344, etc.) determines an active BWP transition during the time-domain period from a first BWP to a second BWP that is associated with one or more changes to the set of parameters. While not shown expressly, one or more TRPs (e.g., a serving cell, neighboring cells, etc.) may receive the SRS-P transmissions and performing positioning measurements thereon. The UE may receive PRS measurement report(s) in response to these positioning measurements.

Referring to FIG. 22, in some designs, the UE may optionally report an indication of the time-domain period and/or set of parameters to a network entity (e.g., a serving base station of the UE, a core network component, etc.). In this case, the network entity may take certain actions to accommodate the UE's positioning session (e.g., avoid any BWP transitions that would violate the first positioning accuracy requirement, etc.). In an example, the optional report may be part of a UE capability message. In an example, the optional report may be implemented per-band or per-frequency (e.g., FR1-specific, FR2-specific, etc.) or per-band combination.

Referring to FIG. 22, the positioning session includes a plurality of SRS-P instances (similar to the PRS instances described above) that include a respective SRS-P resource set (similar to the PRS resource sets described above). The time-domain period associated with the first positioning accuracy requirement may be defined across the positioning session in a variety of ways, including but not limited to:

from an earliest SRS-P resource of a SRS-P resource set for an earliest SRS-P instance to a latest SRS-P resource of a SRS-P resource set for a latest SRS-P instance (e.g., across the entire positioning session), or from an earliest SRS-P resource of a first SRS-P resource set to a latest PRS resource of the first SRS-P resource set (e.g., same SRS-P resource set) or a second SRS-P instance (e.g., spanning multiple SRS-P instances, such as a number of whole SRS-P instances between a previous measurement report to an upcoming measurement report), or from an earliest SRS-P resource of a SRS-P resource set for a first SRS-P instance associated with a particular frequency layer (FL) to a latest SRS-P resource of a SRS-P resource set for the first SRS-P instance (e.g., same SRS-P resource set) or a second SRS-P instance (e.g., spanning multiple SRS-P instances, such as a number of whole SRS-P instances between a previous measurement report to an upcoming measurement report) associated with the particular FL, or from an earliest repetition of a SRS-P resource of a SRS-P resource set for a SRS-P instance to a latest repetition of the same SRS-P resource for the same SRS-P instance, or a specified number of slots (e.g., in case of aperiodic SRS-P, defining the time-domain period using slots may be particularly advantageous, although the LMF and gNB may need to coordinate to reduce uncertainties in implementation).

Referring to FIG. 22, in an example, the transmitting at 2240 may comprise transmitting, while a first BWP is active and the set of parameters remains constant, on a first subset of SRS-P resources. In an example, the determination at 2250 may be reported (e.g., to a network entity, such as a serving base station or core network component). In some designs, in response to the detection, the UE may relax or eliminate a target positioning accuracy requirement from the first positioning accuracy requirement and to a second positioning accuracy requirement, and then continue to transmit, while the second BWP is active, on a second subset of SRS-P resources in accordance with the second positioning requirement accuracy requirement. In some designs, the second positioning requirement accuracy requirement may be an actual positioning requirement accuracy requirement. In other designs, the second positioning requirement accuracy requirement may be no accuracy requirement at all (e.g., the previous target positioning accuracy requirement is effectively eliminated).

Referring to FIG. 22, in response to an active BWP transition determination at 2250, in some designs, the UE may extend a duration of a first time-domain period required for deriving a set of measurements while the first BWP is active for the positioning session (e.g., to provide additional time for performing at least one positioning measurement at one or more TRPs in accordance with the first positioning accuracy requirement). For example, the first time-domain period may be extended to a second time-domain period, a duration of the second time-domain period being based on a number of times a BWP switching delay associated with the determined active BWP transition overlaps with any UL SRS-P resource inside the time-domain period (e.g., if more UL SRS-P resources were missed due to the active BWP transition, then extend the time-domain period further). In some designs, the extending is based at least in part upon whether a measurement gap is configured for the positioning session.

Referring to FIG. 22, in an example, the set of parameters monitored to facilitate the determination at 2250 may include any of the following:
  each parameter associated with the at least one BWP, such that the same BWP remains active throughout the positioning session,
  a bandwidth of the at least one BWP,
  a center part of the bandwidth of the at least one BWP,
  a bandwidth of the at least one BWP that aligns with a bandwidth associated with the plurality of SRS-P instances,
  a numerology of the at least one BWP,
  a DRX configuration of the at least one BWP, or
  any combination thereof.

Referring to FIG. 22, in an example, the first positioning accuracy requirement may comprise a positioning measurement accuracy requirement (e.g., RSRP, RSTD, Rx-Tx, etc.), a positioning fix accuracy requirement (e.g., 6 meters, 3 meters, 3 feet, etc.), or a combination thereof.

Referring to FIG. 19, assume that the PRS instances are replaced with SRS-P instances. In this case, no change is determined in the set of parameters (irrespective of how the set of parameters is defined) across the time-domain period (irrespective of how the time-domain period is defined).

Referring to FIG. 20, assume that the PRS instances are replaced with SRS-P instances. In this case, the active BWP transition may or may not violate the first positioning accuracy requirement of 2230 depending on how the time-domain period and/or the set of parameters are defined. In this case, the SRS-P bandwidth overlaps with the bandwidth of both BWP1 and BWP2. So, as one example, if the set of parameters included only a bandwidth of the at least one BWP that aligns with a bandwidth associated with the plurality of SRS-P instances, then the active BWP transition in this case would not violate the first positioning accuracy requirement.

Referring to FIG. 21, assume that the PRS instances are replaced with SRS-P instances. In this case, the active BWP transition may or may not violate the first positioning accuracy requirement of 2230 depending on how the time-domain period and/or the set of parameters are defined. In this case, the bandwidths for both BWP1 and BWP2 are the same, although other parameters may be different (e.g., DRX, numerology, etc.). So, as one example, if the set of parameters included only a bandwidth of the at least one BWP, then the active BWP transition in this case would not violate the first positioning accuracy requirement.

Process 1800 may include additional implementations, such as any single implementation or any combination of implementations described below and/or in connection with one or more other processes described elsewhere herein.

In a first implementation, process 1800 includes reporting an indication of the time-domain period and/or the set of parameters.

In a second implementation, alone or in combination with the first implementation, the reporting comprises a UE capability message.

In a third implementation, alone or in combination with one or more of the first and second implementations, the reporting is implemented per-band or per-frequency or per-band combination.

In a fourth implementation, alone or in combination with one or more of the first through third implementations, the positioning session includes a plurality of positioning reference signal (PRS) instances that include a respective PRS resource set, and wherein the time-domain period ranges from an earliest PRS resource of a PRS resource set for an earliest PRS instance to a latest PRS resource of a PRS resource set for a latest PRS instance, or from an earliest PRS resource of a first PRS resource set to a latest PRS resource of the first PRS resource set or a second PRS instance, or from an earliest PRS resource of a PRS resource set for a first PRS instance associated with a particular frequency layer (FL) to a latest PRS resource of a PRS resource set for the first PRS instance or a second PRS instance associated with the particular FL, or from an earliest repetition of a PRS resource of a PRS resource set for a PRS instance to a latest repetition of the same PRS resource for the same PRS instance, or a specified number of slots.

In a fifth implementation, alone or in combination with one or more of the first through fourth implementations, process 1800 includes reporting the determination.

In a sixth implementation, alone or in combination with one or more of the first through fifth implementations, the performing includes measuring, while the first BWP is active and the set of parameters remains constant, a first subset of PRS resources.

In a seventh implementation, alone or in combination with one or more of the first through sixth implementations, process 1800 includes in response to the determining relaxing or eliminating a target positioning accuracy requirement from the first positioning accuracy requirement to a second positioning accuracy requirement, and continuing to measure, while the second BWP is active, a second subset of PRS resources in accordance with the second positioning requirement accuracy requirement.

In an eighth implementation, alone or in combination with one or more of the first through seventh implementations, process 1800 includes extending, in response to the determining, a duration of a first time-domain period required for deriving a set of measurements while the first BWP is active for the positioning session.

In a ninth implementation, alone or in combination with one or more of the first through eighth implementations, the extending extends the first time-domain period to a second time-domain period, a duration of the second time-domain period being based on a number of times a BWP switching delay associated with the determined active BWP transition overlaps with any DL PRS resource inside the time-domain period.

In a tenth implementation, alone or in combination with one or more of the first through ninth implementations, the extending is based at least in part upon whether a measurement gap is configured for the positioning session.

In an eleventh implementation, alone or in combination with one or more of the first through tenth implementations, the set of parameters comprises each parameter associated with the at least one BWP, such that the same BWP remains active throughout the positioning session, a bandwidth of the at least one BWP, a center part of the bandwidth of the at least one BWP, a bandwidth of the at least one BWP that aligns with a bandwidth associated with the plurality of PRS instances, a numerology of the at least one BWP, a DRX configuration of the at least one BWP, or any combination thereof.

In a twelfth implementation, alone or in combination with one or more of the first through eleventh implementations, the first positioning accuracy requirement comprises a positioning measurement accuracy requirement, a positioning fix accuracy requirement, or a combination thereof.

In a thirteenth implementation, alone or in combination with one or more of the first through twelfth implementations, the positioning measurements comprise one or more received signal received power (RSRP) measurements, one or more reference signal time difference (RSTD) measurements, one or more receive-transmit (Rx-Tx) measurements, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Process 2200 may include additional implementations, such as any single implementation or any combination of implementations described below and/or in connection with one or more other processes described elsewhere herein.

In a first implementation, the positioning session includes a plurality of SRS-P instances that include a respective SRS-P resource set, and wherein the time-domain period ranges from an earliest SRS-P resource of a SRS-P resource set for an earliest SRS-P instance to a latest SRS-P resource of a SRS-P resource set for a latest PRS instance, or from an earliest SRS-P resource of a first SRS-P resource set to a latest SRS-P resource of the first SRS-P resource set or a second SRS-P instance, or from an earliest SRS-P resource of a SRS-P resource set for a first SRS-P instance associated with a particular frequency layer (FL) to a latest SRS-P resource of a SRS-P resource set for the first SRS-P instance or a second SRS-P instance associated with the particular FL, from an earliest repetition of an SRS-P resource of an SRS-P resource set for an SRS-P instance to a latest repetition of the same SRS-P resource of the same SRS-P resource set for the same SRS-P instance or a specified number of slots.

In a second implementation, alone or in combination with the first implementation, process 2200 includes reporting the determination.

In a third implementation, alone or in combination with one or more of the first and second implementations, the transmitting transmits, while the first BWP is active and the set of parameters remains constant, on a first subset of SRS-P resources.

In a fourth implementation, alone or in combination with one or more of the first through third implementations, process 2200 includes in response to the determining relaxing or eliminating a target positioning accuracy requirement from the first positioning accuracy requirement and to a second positioning accuracy requirement, and continuing to transmit, while the second BWP is active, on a second subset of SRS-P resources.

In a fifth implementation, alone or in combination with one or more of the first through fourth implementations, process 2200 includes extending, in response to the determining, a duration of a first time-domain period required for a cell to derive a set of measurements while the first BWP is active for the positioning session.

In a sixth implementation, alone or in combination with one or more of the first through fifth implementations, the extending extends the first time-domain period to a second time-domain period, a duration of the second time-domain period being based on a number of times a BWP switching delay associated with the determined active BWP transition overlaps with any UL SRS resource inside the time-domain period.

In a seventh implementation, alone or in combination with one or more of the first through sixth implementations, the extending is based at least in part upon whether a measurement gap is configured for the positioning session.

In an eighth implementation, alone or in combination with one or more of the first through seventh implementations, the first positioning accuracy requirement comprises a positioning measurement accuracy requirement, a positioning fix accuracy requirement, or a combination thereof.

In a ninth implementation, alone or in combination with one or more of the first through eighth implementations, the set of parameters comprises each parameter associated with the at least one BWP, such that the same BWP remains active throughout the positioning session, a bandwidth of the at least one BWP, a center part of the bandwidth of the at least one BWP, a bandwidth of the at least one BWP that aligns with a bandwidth associated with the plurality of SRS-P instances, a numerology of the at least one BWP, a DRX configuration of the at least one BWP, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
    receiving, from a network entity, a configuration of positioning reference signal (PRS) resources for a positioning session;
    receiving a configuration of at least one bandwidth part (BWP) from a serving base station (BS);
    identifying a time-domain period for the positioning session where a set of parameters associated with the at least one BWP is to remain constant to achieve a first positioning accuracy requirement;
    performing positioning measurements on one or more of the PRS resources during the positioning session;
    determining an active BWP transition during the time-domain period from a first BWP to a second BWP that is associated with one or more changes to the set of parameters; and
    transmitting a PRS measurement report based on the positioning measurements.

2. The method of claim 1, further comprising:
    reporting an indication of the time-domain period and/or the set of parameters.

3. The method of claim 2, wherein the reporting comprises a UE capability message.

4. The method of claim 2, wherein the reporting is implemented per-band or per-frequency or per-band combination.

5. The method of claim 1,
    wherein the positioning session includes a plurality of positioning reference signal (PRS) instances that include a respective PRS resource set, and
    wherein the time-domain period ranges:
    from an earliest PRS resource of a PRS resource set for an earliest PRS instance to a latest PRS resource of a PRS resource set for a latest PRS instance, or
    from an earliest PRS resource of a first PRS resource set to a latest PRS resource of the first PRS resource set or a second PRS instance, or
    from an earliest PRS resource of a PRS resource set for a first PRS instance associated with a particular frequency layer (FL) to a latest PRS resource of a PRS resource set for the first PRS instance or a second PRS instance associated with the particular FL, or
    from an earliest repetition of a PRS resource of a PRS resource set for a PRS instance to a latest repetition of the same PRS resource for the same PRS instance, or
    a specified number of slots.

6. The method of claim 1, further comprising:
    reporting the determination.

7. The method of claim 1, wherein the performing includes measuring, while the first BWP is active and the set of parameters remains constant, a first subset of PRS resources.

8. The method of claim 7, further comprising:
in response to the determining:
relaxing or eliminating a target positioning accuracy requirement from the first positioning accuracy requirement to a second positioning accuracy requirement; and
continuing to measure, while the second BWP is active, a second subset of PRS resources in accordance with the second positioning requirement accuracy requirement.

9. The method of claim 1, further comprising:
extending, in response to the determining, a duration of a first time-domain period required for deriving a set of measurements while the first BWP is active for the positioning session.

10. The method of claim 9, wherein the extending extends the first time-domain period to a second time-domain period, a duration of the second time-domain period being based on a number of times a BWP switching delay associated with the determined active BWP transition overlaps with any DL PRS resource inside the time-domain period.

11. The method of claim 9, wherein the extending is based at least in part upon whether a measurement gap is configured for the positioning session.

12. The method of claim 1, wherein the set of parameters comprises:
each parameter associated with the at least one BWP, such that the same BWP remains active throughout the positioning session,
a bandwidth of the at least one BWP,
a center part of the bandwidth of the at least one BWP,
a bandwidth of the at least one BWP that aligns with a bandwidth associated with the plurality of PRS instances,
a numerology of the at least one BWP,
a DRX configuration of the at least one BWP, or
any combination thereof.

13. The method of claim 1, wherein the first positioning accuracy requirement comprises a positioning measurement accuracy requirement, a positioning fix accuracy requirement, or a combination thereof.

14. The method of claim 1, wherein the positioning measurements comprise one or more received signal received power (RSRP) measurements, one or more reference signal time difference (RSTD) measurements, one or more receive-transmit (Rx-Tx) measurements, or any combination thereof.

15. A method of operating a user equipment (UE), comprising:
receiving, from a network entity, a configuration of sounding reference signal (SRS) resources for positioning (SRS-P) for a positioning session;
receiving a configuration of at least one bandwidth part (BWP) from a serving base station (BS);
identifying a time-domain period for the positioning session where a set of parameters associated with the at least one BWP is to remain constant to achieve a first positioning accuracy requirement;
transmitting on one or more of the SRS-P resources during the positioning session; and
determining an active BWP transition during the time-domain period from a first BWP to a second BWP that is associated with one or more changes to the set of parameters.

16. The method of claim 15,
wherein the positioning session includes a plurality of SRS-P instances that include a respective SRS-P resource set, and
wherein the time-domain period ranges:
from an earliest SRS-P resource of a SRS-P resource set for an earliest SRS-P instance to a latest SRS-P resource of a SRS-P resource set for a latest PRS instance, or
from an earliest SRS-P resource of a first SRS-P resource set to a latest SRS-P resource of the first SRS-P resource set or a second SRS-P instance, or
from an earliest SRS-P resource of a SRS-P resource set for a first SRS-P instance associated with a particular frequency layer (FL) to a latest SRS-P resource of a SRS-P resource set for the first SRS-P instance or a second SRS-P instance associated with the particular FL,
from an earliest repetition of an SRS-P resource of an SRS-P resource set for an SRS-P instance to a latest repetition of the same SRS-P resource of the same SRS-P resource set for the same SRS-P instance or
a specified number of slots.

17. The method of claim 15, further comprising:
reporting the determination.

18. The method of claim 15, wherein the transmitting transmits, while the first BWP is active and the set of parameters remains constant, on a first subset of SRS-P resources.

19. The method of claim 17, further comprising:
in response to the determining:
relaxing or eliminating a target positioning accuracy requirement from the first positioning accuracy requirement and to a second positioning accuracy requirement; and
continuing to transmit, while the second BWP is active, on a second subset of SRS-P resources.

20. The method of claim 15, further comprising:
extending, in response to the determining, a duration of a first time-domain period required for a cell to derive a set of measurements while the first BWP is active for the positioning session.

21. The method of claim 20, wherein the extending extends the first time-domain period to a second time-domain period, a duration of the second time-domain period being based on a number of times a BWP switching delay associated with the determined active BWP transition overlaps with any UL SRS resource inside the time-domain period.

22. The method of claim 20, wherein the extending is based at least in part upon whether a measurement gap is configured for the positioning session.

23. The method of claim 15, wherein the first positioning accuracy requirement comprises a positioning measurement accuracy requirement, a positioning fix accuracy requirement, or a combination thereof.

24. The method of claim 15, wherein the set of parameters comprises:
each parameter associated with the at least one BWP, such that the same BWP remains active throughout the positioning session,
a bandwidth of the at least one BWP,
a center part of the bandwidth of the at least one BWP,
a bandwidth of the at least one BWP that aligns with a bandwidth associated with the plurality of SRS-P instances,
a numerology of the at least one BWP,
a DRX configuration of the at least one BWP, or
any combination thereof.

25. A user equipment (UE), comprising:
  means for receiving, from a network entity, a configuration of positioning reference signal (PRS) resources for a positioning session;
  means for receiving a configuration of at least one bandwidth part (BWP) from a serving base station (BS);
  means for identifying a time-domain period for the positioning session where a set of parameters associated with the at least one BWP is to remain constant to achieve a first positioning accuracy requirement;
  means for performing positioning measurements on one or more of the PRS resources during the positioning session;
  means for determining an active BWP transition during the time-domain period from a first BWP to a second BWP that is associated with one or more changes to the set of parameters; and
  means for transmitting a PRS measurement report based on the positioning measurements.

26. A user equipment (UE), comprising:
  means for receiving, from a network entity, a configuration of sounding reference signal (SRS) resources for positioning (SRS-P) for a positioning session;
  means for receiving a configuration of at least one bandwidth part (BWP) from a serving base station (BS);
  means for identifying a time-domain period for the positioning session where a set of parameters associated with the at least one BWP is to remain constant to achieve a first positioning accuracy requirement;
  means for transmitting on one or more of the SRS-P resources during the positioning session; and
  means for determining an active BWP transition during the time-domain period from a first BWP to a second BWP that is associated with one or more changes to the set of parameters.

27. A user equipment (UE), comprising:
  a memory;
  at least one transceiver; and
  at least one processor communicatively coupled to the memory, the at least one transceiver, the at least one processor configured to:
    receive, from a network entity via the at least one transceiver, a configuration of positioning reference signal (PRS) resources for a positioning session;
    receive, via the at least one transceiver, a configuration of at least one bandwidth part (BWP) from a serving base station (BS);
    identify, via the at least one processor, a time-domain period for the positioning session where a set of parameters associated with the at least one BWP is to remain constant to achieve a first positioning accuracy requirement;
    perform, via the at least one processor, positioning measurements on one or more of the PRS resources during the positioning session;
    determine, via the at least one processor, an active BWP transition during the time-domain period from a first BWP to a second BWP that is associated with one or more changes to the set of parameters; and
    transmit, via the at least one transceiver, a PRS measurement report based on the positioning measurements.

28. A user equipment (UE), comprising:
  a memory;
  at least one transceiver; and
  at least one processor communicatively coupled to the memory, the at least one transceiver, the at least one processor configured to:
    receive, from a network entity via the at least one transceiver, a configuration of sounding reference signal (SRS) resources for positioning (SRS-P) for a positioning session;
    receive, via the at least one transceiver, a configuration of at least one bandwidth part (BWP) from a serving base station (BS);
    identify, via the at least one processor, a time-domain period for the positioning session where a set of parameters associated with the at least one BWP is to remain constant to achieve a first positioning accuracy requirement;
    transmit, via the at least one transceiver, on one or more of the SRS-P resources during the positioning session; and
    determine, via the at least one processor, an active BWP transition during the time-domain period from a first BWP to a second BWP that is associated with one or more changes to the set of parameters.

29. A non-transitory computer-readable medium containing instructions stored thereon, which, when executed by a user equipment (UE), cause the UE to perform operations, the instructions comprising:
  at least one instruction to cause the UE to receive, from a network entity, a configuration of positioning reference signal (PRS) resources for a positioning session;
  at least one instruction to cause the UE to receive a configuration of at least one bandwidth part (BWP) from a serving base station (BS);
  at least one instruction to cause the UE to identify a time-domain period for the positioning session where a set of parameters associated with the at least one BWP is to remain constant to achieve a first positioning accuracy requirement;
  at least one instruction to cause the UE to perform positioning measurements on one or more of the PRS resources during the positioning session;
  at least one instruction to cause the UE to determine an active BWP transition during the time-domain period from a first BWP to a second BWP that is associated with one or more changes to the set of parameters; and
  at least one instruction to cause the UE to transmit a PRS measurement report based on the positioning measurements.

30. A non-transitory computer-readable medium containing instructions stored thereon, which, when executed by a user equipment (UE), cause the UE to perform operations, the instructions comprising:
  at least one instruction to cause the UE to receive, from a network entity, a configuration of sounding reference signal (SRS) resources for positioning (SRS-P) for a positioning session;
  at least one instruction to cause the UE to receive a configuration of at least one bandwidth part (BWP) from a serving base station (BS);
  at least one instruction to cause the UE to identify a time-domain period for the positioning session where a set of parameters associated with the at least one BWP is to remain constant to achieve a first positioning accuracy requirement;
  at least one instruction to cause the UE to transmit on one or more of the SRS-P resources during the positioning session; and at least one instruction to cause the UE to determine an active BWP transition during the time-domain period from a first BWP to a second BWP that is associated with one or more changes to the set of parameters.

\* \* \* \* \*